(12) United States Patent
Vaughan et al.

(10) Patent No.: US 6,444,127 B1
(45) Date of Patent: Sep. 3, 2002

(54) WATER CONDITIONING UNIT CONTROL VALVE

(75) Inventors: Don Vaughan, Brookfield; Richard W. Wilder, Elm Grove; Robert A. Clack, Sun Prairie, all of WI (US)

(73) Assignee: Clack Corportion, Windsor, WI (US)

(*) Notice: Subject to any disclaimer, the term of this patent is extended or adjusted under 35 U.S.C. 154(b) by 13 days.

(21) Appl. No.: 09/667,227

(22) Filed: Sep. 21, 2000

(51) Int. Cl.[7] .............................................. B01D 37/04
(52) U.S. Cl. ........................ 210/662; 210/91; 210/140; 210/145; 210/190; 210/269; 210/424; 210/670; 137/554; 137/624.13; 137/625.19
(58) Field of Search ........................ 210/91, 140, 143, 210/145, 190, 269, 424, 662, 670, 792; 137/554, 624.13, 624.14, 624.15, 625.29; 251/129.11, 129.12

(56) References Cited

U.S. PATENT DOCUMENTS

| | | | |
|---|---|---|---|
| 3,042,357 A | * | 7/1962 | Engholdt |
| 3,441,047 A | | 4/1969 | Lyall et al. |
| 3,700,007 A | | 10/1972 | Sparling et al. |
| 3,756,282 A | * | 9/1973 | Knutsen |
| 3,874,412 A | | 4/1975 | Fleckenstein et al. |
| 4,181,605 A | | 1/1980 | Braswell |
| 4,238,325 A | | 12/1980 | Heskett |
| 4,239,621 A | | 12/1980 | Heskett |
| 4,290,451 A | | 9/1981 | Fleckenstein et al. |
| 4,298,025 A | | 11/1981 | Prior et al. |
| 4,410,430 A | | 10/1983 | Hagler, Jr. |
| 4,426,294 A | | 1/1984 | Seal |
| 4,469,602 A | | 9/1984 | Seal |
| 4,470,911 A | | 9/1984 | Reinke |
| 4,539,106 A | | 9/1985 | Schwartz |
| 5,013,461 A | | 5/1991 | Drori |
| 5,089,140 A | | 2/1992 | Brane et al. |
| 5,300,230 A | | 4/1994 | Brane et al. |
| 5,589,058 A | | 12/1996 | Bauer |
| 5,639,377 A | | 6/1997 | Banham et al. |
| 5,741,005 A | | 4/1998 | Vaughan et al. |
| 5,751,598 A | | 5/1998 | Zabinski et al. |
| 5,879,559 A | | 3/1999 | Schreiner et al. |
| 5,893,976 A | | 4/1999 | Bauer |
| 5,910,244 A | | 6/1999 | Stamos et al. |

OTHER PUBLICATIONS

Siata SpA—Societa Italiana Apparecchiature Trattamento Acqua, *Quasar Valve Series Specifications*, Catalog V119, pp. 1–25 (3/01).
"So How Does a Water Softener Work", Avonsoft, http://www.tonyj.demon.co.uk/how.htm, Mar. 10, 2000.

* cited by examiner

*Primary Examiner*—Joseph W. Drodge
(74) *Attorney, Agent, or Firm*—Boyle Fredrickson Newholm Stein & Gratz S.C.

(57) ABSTRACT

A highly versatile drive arrangement that drives a linearly reciprocating piston of a water conditioning unit control valve without imparting any significant side loads on the support structure for the piston's drive rod or the associated seals. The drive arrangement includes a reversible electric motor and a motion converter, such as a lead screw arrangement, that converts the rotary motion of the electric motor's pinion or other output element to reciprocating linear motion of the piston. The reversible motor can be controlled, based on signals from a motion monitor such as an encoder, to drive the piston to any desired position within the piston upon command. This, in turn, permits the operation of the water conditioning unit to be optimized for prevailing conditions and permits the control valve's operation to be altered if, e.g., the piston becomes stuck or encounters an obstruction.

28 Claims, 18 Drawing Sheets

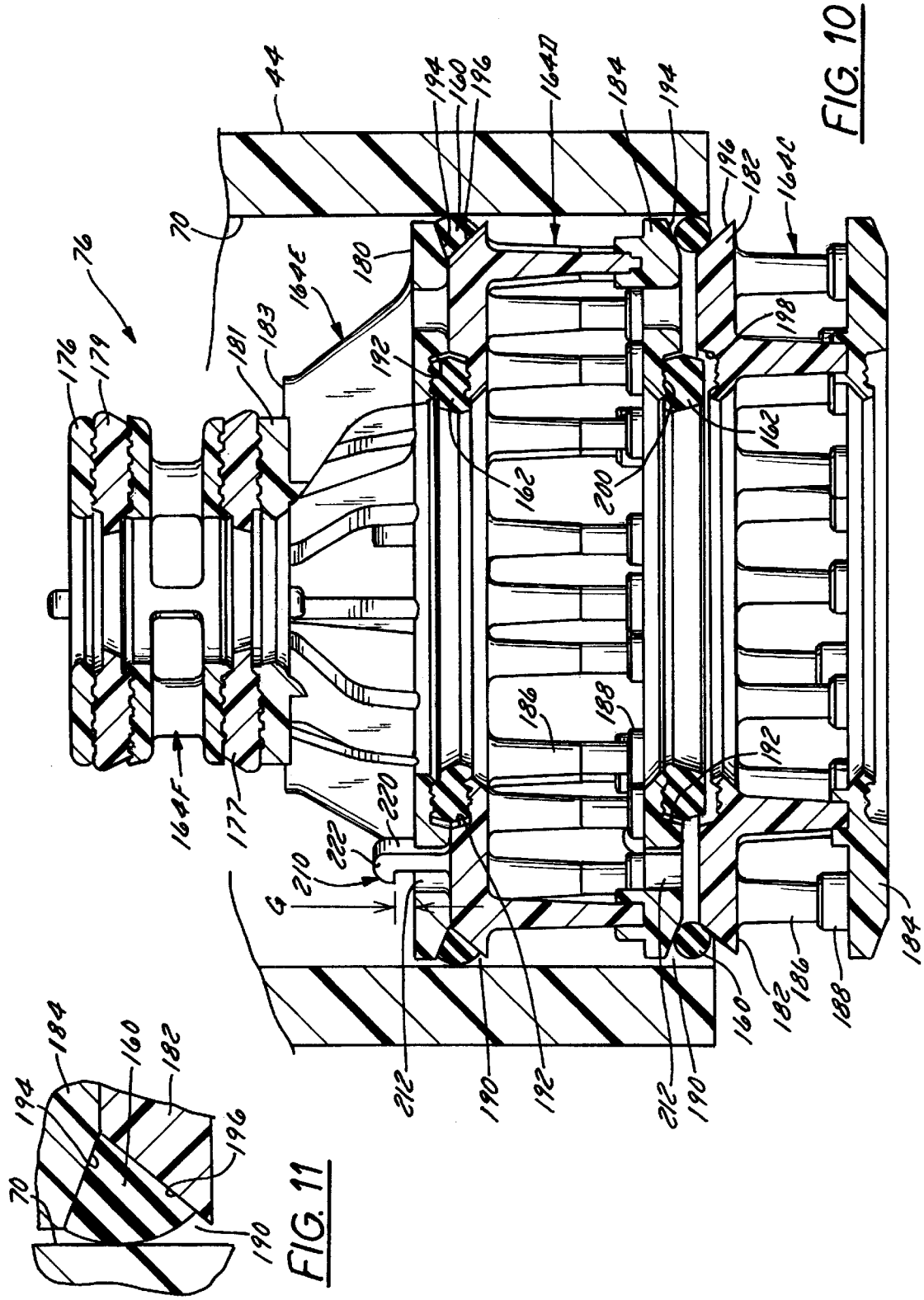

WATER CONDITIONING UNIT CONTROL VALVE

BACKGROUND OF THE INVENTION

1. Field of the Invention

The invention relates to control valves usable in water softeners and other potable water conditioning units and, more particularly, relates to a control valve having a linearly reciprocating piston that is driven by a motor without imparting any significant side load to the support structure for the piston's drive rod or the associated seals. The invention additionally relates to a method and apparatus for operating a water conditioning unit control valve so as to enhance the valve's versatility and reliability.

2. Discussion of the Related Art

A variety of water conditioning units are available for softening, filtering, and/or otherwise treating potable water for residential and commercial applications. The most common water conditioning units are filtration systems that remove impurities from water, and water softeners that exchange undesirable ions such as calcium with more desirable ions such as sodium. Many of these water conditioning units employ a control valve for controlling the flow of water through the water conditioning unit. Some of those control valves have a movable piston that is actuated by an electric motor to connect various ports of the control valve to one another.

For example, control valves are widely used to control the regeneration cycles of water softeners. Water softeners are widely used for removing calcium and other deposit causing materials from so-called "hard water." The typical water softener relies on an ion exchange process taking place in an ion-exchange resin bed stored in a resin tank of the water softener. As the water to be processed passes through the resin filled tank, ions of calcium and other minerals in the water are exchanged with ions found in the resin, e.g., sodium, thereby removing objectionable ions from the water and exchanging them for less objectionable ions from the resin.

The capacity of the resin to exchange ions is finite and is reduced during the ion exchange process. If measures are not taken to regenerate the resin by replacing the undesirable ions with desirable ions, the ion exchange capacity of the resin, will become exhausted. Water softeners therefore are typically configured to periodically regenerate the ion exchange resin stored in the resin tank. Regeneration typically involves chemically replacing the objectionable ions such as calcium ions from the resin with less objectionable ions such as sodium ions. This replacement is typically performed by introducing a regenerant solution of sodium chloride or potassium chloride into the resin bed from a brine tank and thereafter flushing the regenerant solution from the bed. Regeneration of a water softener resin bed is sometimes accomplished in a direction that is co-current with the flow of water to be treated (often referred to as "downflow regeneration") and is sometimes accomplished in a direction that is countercurrent to the flow of water being treated (often referred to as "upflow regeneration"). The resin bed is typically backwashed in order to remove trapped particulate matter and rinsed to remove untreated backwash water from the lower portion of the resin bed. In order to prevent interruption of service, most water softeners are configured to allow bypass flow of untreated water directly to the treated water outlet during backwash, rinse, and regeneration. All of these operations are known in the art.

The regeneration cycle is typically controlled by a control valve mounted on top of the resin tank. The control valve is coupled to a source of untreated water, a treated water or service outlet line, the brine tank, a drain connection, and the resin tank. The typical control valve is controlled by an electric motor under the control of a timer and/or a usage indicator to cycle the water softener from service, brine introduction, backwash, fast rinse, and back to service.

Several different types of control valves have been used in water softeners. Some are of the rotary disc type, in which the motor rotates a three-dimensional disc to selectively connect and cover various inlet and outlet ports in the valve body bore in which the disc is mounted. A control valve of the type manufactured by Eco Water of Woodbury, Mn. Another control valve type, manufactured by Osmonics, comprises modified poppet valves. These multiple valve elements are independently actuated by cams. Still others are of the so-called reciprocating piston type, in which the motor drives a piston to reciprocate axially in a bore to selectively connect and cover various inlet and outlet ports in the bore. See, for example, U.S. Pat. Nos. 3,700,007 to Sparling and U.S. Pat. No. 4,290,451 to Fleckenstein et al. The invention relates to water softeners and other water conditioning units employing reciprocating piston-type control valves.

The typical reciprocating piston-type water softener control valve includes a seal arrangement that is positioned in a cylindrical bore and that surrounds the reciprocating piston. A piston is driven to reciprocate within the seal stack by a drive arrangement. The typical drive arrangement includes an AC electric motor and a motion converter that converts the rotary motion of the electric motor's pinion to linear motion of the piston. Prior known motion converters comprised an offset cam or an offset linkage arrangement. Piston drive arrangements employing these motion converters exhibit several drawbacks.

For instance, they are nonreversible. As a result, they cannot be controlled to repeat any steps in the valve's operational cycle. They also have a fixed path and, therefore, cannot be reprogrammed after initial assembly to skip one or more phases of the valve's operational cycle. These drawbacks conspire to considerably restrict the range of applications of the typical water conditioning unit control valve and to prevent the operation of a water softener or other water conditioning unit that employs such a valve to be customized to meet a particular application's needs. The pistons of these control valves are also subject to jamming because they cannot be backed away from an obstruction to permit the obstruction to clear the valve.

In addition, the support structure for the piston's drive rod and the seals associated with that support structure are subjected to substantial side-loading by the associated motion converter. This side-loading can lead to accelerated wear and early failure of the motion converter and some of the system's seals. It can also elevate the risk of valve element jamming.

The need therefore has arisen to provide a drive arrangement for a linearly reciprocating water conditioning unit flow control valve that includes a motion converter which converts the rotary motion of the arrangement's motor to the linear motion of the piston of the control valve without imparting any side load on the support structure for the piston's drive rod or its associated seals. The need also exists to provide a water conditioning unit flow control valve that is versatile so as to permit the operation of the water conditioning unit to be optimized for a particular application and to be varied as required to meet the current needs of the water conditioning unit.

SUMMARY OF THE INVENTION

In accordance with a first aspect of the invention, a water conditioning unit control device includes a reversible electric motor and a linearly reciprocatable piston that is driven without significant side loading on the support structure for the piston's drive rod or the associated seals. Side loading is prevented by transferring torque from the motor to the piston arrangement using a converter which has an input coupled to the output element of the motor and which has an output which is coupled to the piston such that the piston moves linearly with the converter output. The converter converts bidirectional rotary motion of the motor output element to reciprocating linear movement of the piston. Preferably, the converter includes a lead screw arrangement comprising a driven gear and an externally threaded shaft or drive rod. The driven gear is driven by the output element of the motor and which has internal threads. The shaft extends through the driven gear in mating engagement with the threads thereof so as to move linearly relative to the driven gear upon rotation of the driven gear, and has a distal end portion which may be coupled to the piston or formed integrally with it.

The control valve may further comprise a stationary seal stack disposed in the bore and having a plurality of axially-spaced dynamic seals. In this case, the piston preferably has a plurality of axially-spaced lands thereon which selectively engage the dynamic seals to place selected ones of the ports into communication with one another.

In accordance with another aspect of the invention, a water conditioning unit control device is capable of varying the operation of the water conditioning unit without reconfiguring the structure of the control device and is capable of reacting to obstructions and other problems encountered by the control device. The control device includes a control valve, a reversible electric motor, and a controller. The control valve includes a piston which is movable linearly between a plurality of positions with respect to a valve bore of the control valve, thereby selectively connecting various ports in the valve bore to one another, the ports including at least an untreated water inlet port and a treated water outlet port. The motor, which may comprise a reversible DC motor, has an output element which is coupled to the piston and which is actuatable to drive the piston between the positions. The controller includes 1) an optical encoder or other position monitor which directly or indirectly monitors movement of the piston, and 2) a driver which is coupled to the position monitor and to the motor and which controls operation of the motor based on signals from the position monitor.

The motor preferably is a variable torque motor the output torque of which can be varied by varying the magnitude of drive current supplied thereto, and the controller preferably is operable, based on signals received from the position monitor, to determine whether the piston is stuck and to boost drive current to the motor if it is determined that the piston is stuck.

The controller preferably is operable, based on signals received from the position monitor, to determine whether the piston has encountered an obstruction. If it is determined that the piston has encountered an obstruction when traveling towards its intended position, the controller is operable to attempt to clear the obstruction by energizing the motor to back the piston away from the obstruction and by thereafter energizing the motor to drive the piston back towards the intended position.

In accordance with still another aspect of the invention, a method is provided that achieves at least some of the benefits of the water conditioning unit control devices described above.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation.

BRIEF DESCRIPTION OF THE DRAWINGS

A preferred exemplary embodiment of the invention is illustrated in the accompanying drawings in which like reference numerals represent like parts throughout, and in which:

FIG. 10 is a fragmentary sectional elevation view showing removal of the seal stack from the associated bore of the control valve;

FIG. 11 is a detail view of a portion of the subassembly of FIG. 10;

DETAILED DESCRIPTION OF THE PREFERRED EMBODIMENT

1. Resume

Pursuant to the invention, a highly versatile drive arrangement is provided for a water conditioning unit flow control valve that drives a linearly reciprocating piston of the control valve without imparting any significant side loads on the support structure for the piston's drive rod or its associated seals. The drive arrangement includes a reversible electric motor and a motion converter, such as a lead screw arrangement, that converts the rotary motion of the electric motor's pinion or other output element to the reciprocating linear motion of the piston. The reversible motor can be controlled, based on signals from a motion monitor such as an encoder, to drive the piston to any desired position within the piston upon command. This, in turn, permits the operation of the water conditioning unit to be optimized for prevailing conditions and permits the control valve's operation to be altered if the piston becomes stuck or encounters an obstruction.

2. System Overview

The invention is applicable to any water conditioning unit that 1) is used to treat potable water on a small or intermediate scale, such as residential or commercial applications and 2) uses a linearly reciprocating flow control valve to control the flow of water through the water conditioning unit. Examples of such water conditioning units include activated carbon filtration systems, iron or particulate removal systems, anion exchange systems, and cation exchange systems such as water softeners. The control valves of some such units do no more than activate or deactivate the conditioning unit and, accordingly, may comprise relatively simple two-position, two-way or three-way valves. Other control valves, such as water softener control valves, perform more complex flow control operations and may comprise multi-position, multi-way flow control valves. Hence, while the invention is disclosed herein primarily in conjunction with a water softener control valve, it is usable in a variety of other applications as well.

Figure 1:
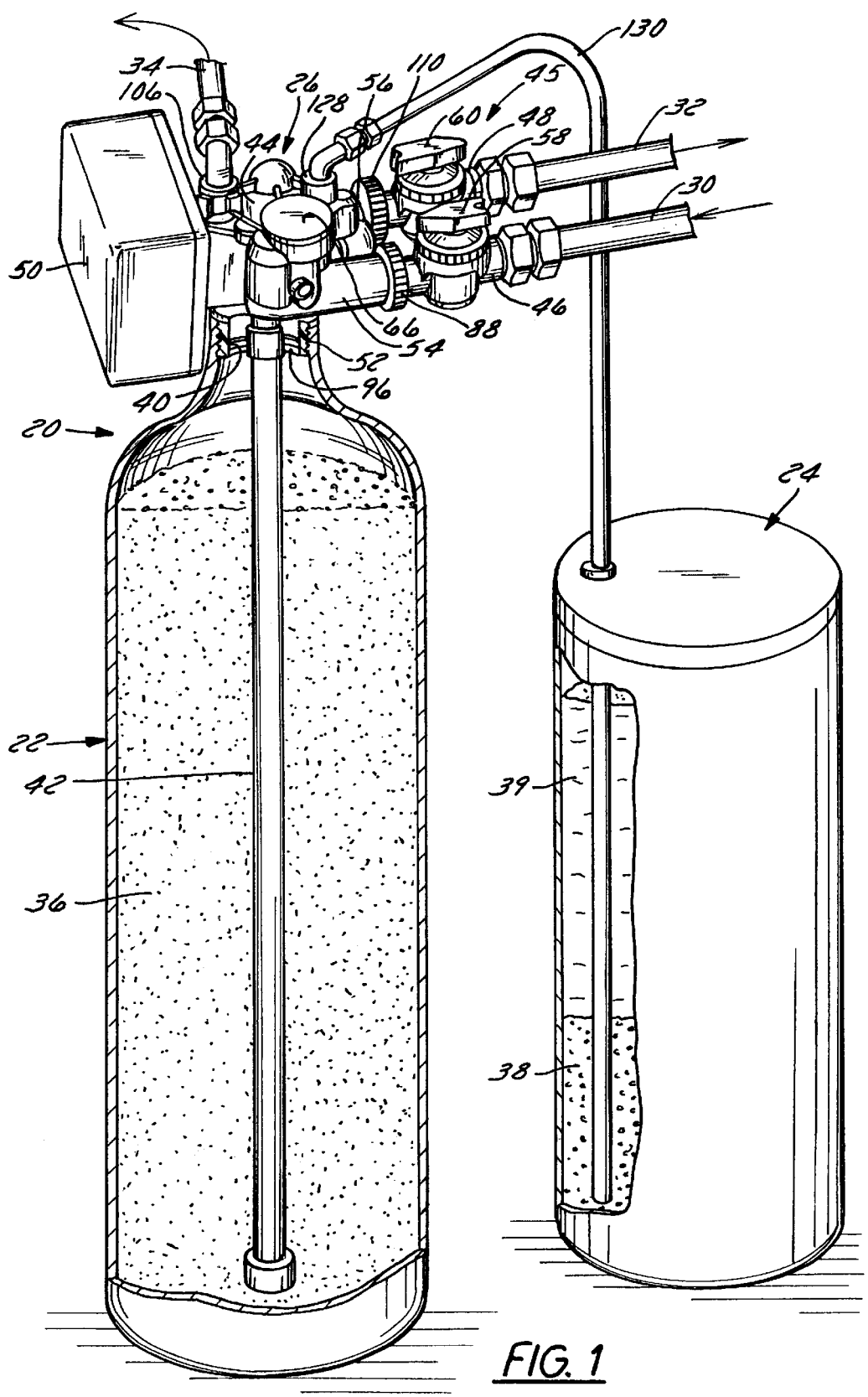
FIG. 1 is a partially-cut away perspective view of a water softener employing a water softener control valve constructed in accordance with a preferred embodiment of the present invention.

Referring to the drawings and initially to FIG. 1, a water softener 20 is illustrated that employs a control valve and seal stack constructed in accordance with a preferred embodiment of the invention. The water softener 20 includes a resin tank 22, a brine tank 24, and a control valve 26 threaded onto the top of the resin tank 22. The control valve 26 is fluidically coupled to the resin tank 22, the brine tank 24, a line 30 leading to a source of untreated water, a treated water line 32, and a drain line 34. The resin tank 22 is filled with a treatment medium such as an ion exchange resin bed 36, and the brine tank 24 contains particles 38 of sodium chloride, potassium permanganate, or another suitable regeneration medium which can be dissolved by water to form a brine or regenerant solution 39. In operation, as incoming hard water enters the resin tank 22 through an opening 40 in the top of the resin tank 22, the water in the resin tank is forced through the resin bed 36 and out a distribution tube 42 extending through the center of the resin bed 36. The capacity of the resin bed 36 to exchange ions with the minerals and impurities in the incoming hard water is finite, and depends on (1) the treatment capacity of the resin bed 36 as measured in kilograms of hardness or grams of $CaCO_3$ and (2) the hardness of the incoming water as typically measured in grains per gallon. To regenerate the resin bed 36 once its treating capacity has been depleted, the resin bed 36 is flushed with the regenerant solution 39 from the brine tank 24 so that the minerals and other impurities can be released from the resin bed 36 and carried out of the resin tank 22. All of these operations, as well as optional attendant backwash and rinse operations, are controlled by the water softener control valve 26.

Figure 2:
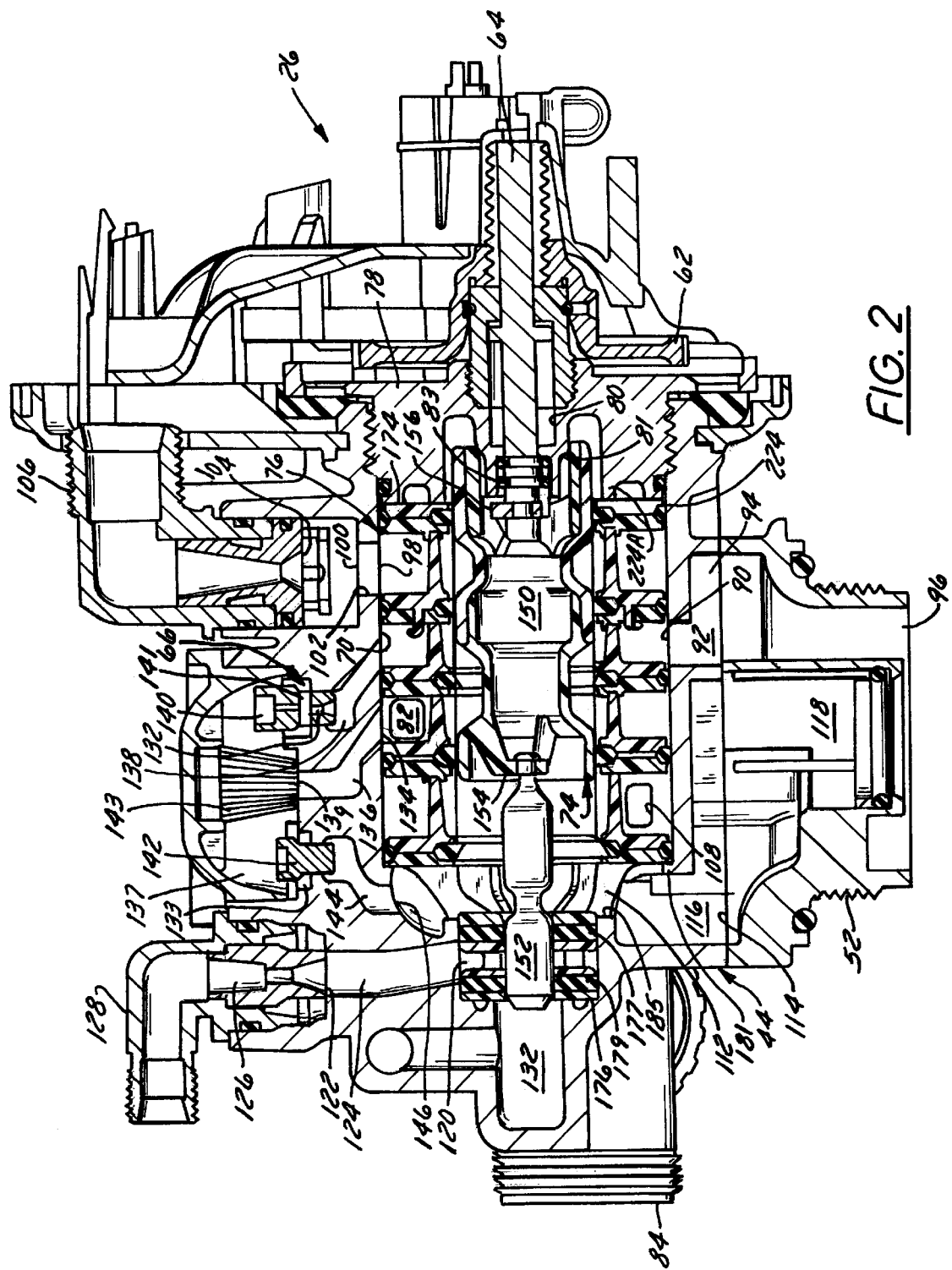
FIG. 2 is a sectional side elevation view of the control valve of the water softener of FIG. 1.
Figure 3:
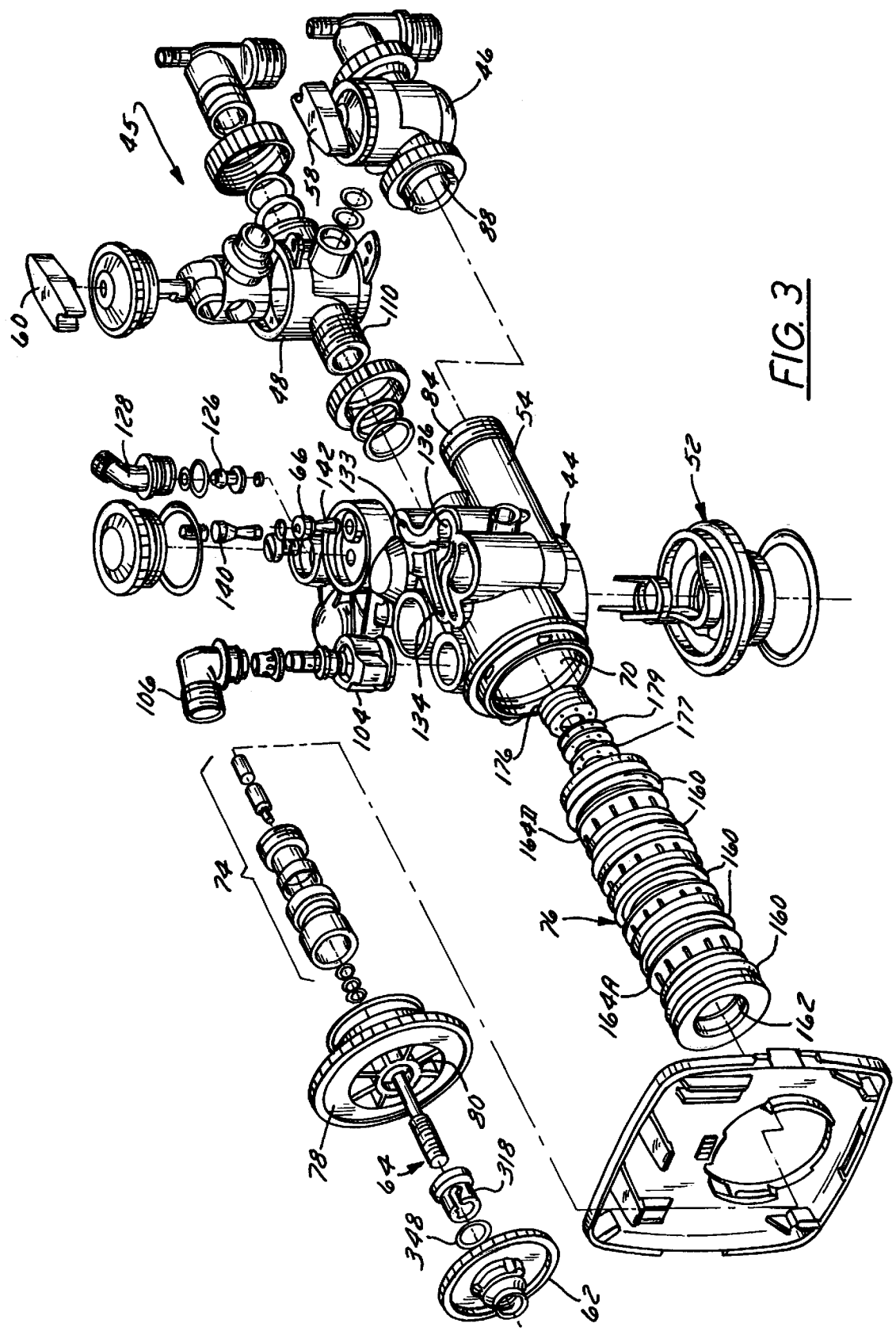
FIG. 3 is an exploded perspective view of the control valve.

Referring to FIGS. 1–3 the valve 26 includes a valve body 44, a bypass valve 45 (formed from an untreated water inlet module 46 and a treated water or service outlet module 48), and a timer/controller module 50. The valve 26 is mounted on the resin tank 22 via a valve body mount 52 threaded into the top of the resin tank at its lower end and connected to the bottom of the valve body 44 at its upper end. The bypass valve 45 is mounted on rearwardly extending couplers 54 and 56 of the valve body 44. Knobs 58 and 60 of the valve 45 can be turned to permit the water softener 20 to be bypassed altogether for service or repair. The timer/control module 50 is mounted on a front of the valve body 44 and includes a timer and/or an electronic controller for energizing an electrically operated valve driver such as a reversible DC electric motor (not shown). The valve driver drives a gear 62 to linearly translate a threaded drive rod or shaft 64 that extends into the valve body 44 to operate the valve 26. An injector 66 is mounted on top of the valve body 44 for drawing the regenerant solution 39 through the resin tank 22 during a regeneration cycle. Still referring to FIGS. 2 and 14–18 the valve body 44 comprises an injection molded plastic element having several fittings and other components mounted thereon. A central bore 70 is formed in the valve body 44 and is configured to receive a valve element 72 formed from a linearly movable piston 74 and a seal stack 76, both detailed below. The bore 70 is capped at its outer end by a cap 78 that is threaded into the outer end of the bore 70 and that has an internal opening 80 for the passage of the drive rod 64.

Also molded within the valve body 44 are several external ports opening into the exterior of the valve body 44, several interior ports opening into the bore 70, and several passages connecting the internal ports to the external ports. Specifically, referring to FIGS. 2 and 14–18, an internal untreated water inlet port 82 opens radially into a central portion of the bore 70 and is connected to an external untreated water inlet port 84 via an untreated water flow passage (not shown). The external untreated water inlet port 84 is connected to a fitting 88 (FIG. 1) opening into the untreated water inlet valve module 46. An internal top-of-tank port 90 opens radially into the bore 70 at a location just outwardly of the untreated water inlet port 82 and communicates with an external top of tank port 92 via a flow passage 94. The external top of tank port 92 opens into a first flow passage 96 in the resin tank mount 52 that communicates with the opening 40 in the top of the resin tank 22. An internal drain port 98 opens radially into the bore 70 at a location just outwardly of the top of tank port 90 and communicates with an external drain port 100 of the valve body 44 via a flow passage 102 (only a portion of which is shown). The external drain port 100 opens into a drain assembly including a restricting flow control valve 104 and a fitting 106 configured for connection to the drain line 34. An internal treated water outlet port 108 opens radially into the bore 70 at a location just inwardly of the untreated water inlet port 82 and is connected to an external treated water outlet port via a flow passage (neither of which is shown). The external service port is connected to a fitting 110 (FIG. 1) opening into the service valve module 48. An internal distribution port 112 opens radially into the bore 70 at a location axially inwardly of the treated water outlet port 108 and communicates with an external distribution port 114 via a flow passage 116. The external distribution port 114 opens into a second flow passage 118 in the resin tank mount 52 that communicates with an inlet of the distribution tube 42. An internal brine port 120 opens radially into a reduced diameter inner end section of the bore 70 at a location downstream of the distribution port 112 and communicates with an external brine port 122 via a flow passage 124. The external brine port 122 opens into a brine fitting assembly including a restricting flow control valve 126 and a fitting 128 configured for connection to a regenerant solution line 130 that leads to the brine tank 24 as seen in FIG. 1.

Still referring to FIGS. 2 and 14–18, the injector 66 comprises a nozzle 140 and a throat 141. An injector inlet passage 132 is formed by the inner axial endmost section of the bore 70. Passage 132 opens into a chamber 133 communicating with the injector 66 between the nozzle 140 and the throat 141. Another chamber 137, located above the chamber 133, houses an injector screen 143. Water flows into an inlet 139 of the chamber 137 via an inlet passage 136 coupled to the untreated water inlet port 82.

In the illustrated configuration in which the valve 26 is configured for downflow regeneration, the outlet of the injector 66 opens into a passage 138 coupled to the top-of-tank port 90. Another passage 144, coupled to the distribution port 112, is plugged with a plug 142. With this configuration, water from the passage 136 flows into the chamber 137 through the inlet 139, and then flows through the screen 143, through the injector 66, and into the top-of-tank port 90 through the passage 138. The pressure drop created by this flow draws regenerant solution 39 through the throat 141 and into the passage 138 from the inlet passage 132, thus causing regenerant solution to flow into the resin tank 22 from above.

The valve 26 could be configured for upflow regeneration by switching the locations of the injector 66 and the plug 142 in order to permit fluid flow through a passage 144 in fluid communication with the distribution port 112 and in order to prevent fluid flow into the top-of-tank port 90 via the passage 138. With this configuration, water from the passage 136 flows into the chamber 137 through the inlet 139, through the screen 143, through the injector 66, and into the distribution port 112 through the passage 146. The pressure drop created by this flow draws regenerant solution 39 through the throat 141 and into the passage 144 from the inlet passage 132, thus causing regenerant solution 39 to flow into the resin tank 22 from below.

As briefly discussed above, flow between the various ports of the valve body 44 is controlled by the valve element 72 as actuated by the controller and the valve driver. A preferred valve element will now be detailed.

3. Valve Element

The piston 74 and seal stack 76 of the valve element 72 are configured, depending on the location of the piston 74 within the seal stack 76, to connect various ones of the internal ports of the valve body 44 to one another, thereby setting flowpaths through the valve body 44 that differ with piston position. The seal stack 76 also is configured to be easily inserted into and removed from the bore 70 as a unit while still assuring a tight seal against the peripheral surface of the bore 70 when the valve 26 is assembled. The seal stack 76 could either be a stationary seal stack mounted in the bore 70 as discussed below or a movable seal arrangement whose dynamic seals are mounted on the piston 74.

Referring to FIGS. 2, 4, and 14–18, the piston 74 may comprise any structure or combination of structures that is linearly reciprocatable within the seal stack 76 to selectively engage the dynamic seals 162 (detailed below) to place selected ones of the ports 82, 84, 90, etc. into communication with one another. In the illustrated embodiment, the piston comprises a main portion 150 and a brine portion 152 connected end to end. The brine portion 152 is of a considerably smaller diameter than the main portion 150. The main portion 150 is hollow and has clips 154 and 156 in its inner and outer ends for attachment to a tail of the drive rod 64 and a head of the brine portion 152 respectively, thereby assuring that the drive rod 64, the main portion 150, and brine portion 152 all move as a unit upon axial translation of the drive rod 64 relative to the valve body 44. Both portions are stepped so as to present a plurality of lands separated from one another by circular grooves. The outer peripheries of both portions are formed of a relatively rigid, durable, water impervious substance such as polypropylene or polyphenylene oxide (PPO).

Referring to FIGS. 3–6, the seal stack 76 is formed from a plurality of radially outer, axially spaced static seals 160 that seal against the peripheral surface of the bore 70, a plurality of radially inner, axially spaced dynamic seals 162 that seal against the lands of the piston 74, and a plurality of spacers 164A–164F. The static seals 160 comprise simple O-rings formed of natural rubber, synthetic rubber, or any elastomeric material suitable for use in a static seal. An EPDM rubber or LSR is preferred. The uncompressed diameter of the static seal 160 is preferably less than the diameter of the bore 70. This relationship permits free sliding movement of the static seals 160 past the relatively large, unobstructed ports in the bore 70 during valve assembly and disassembly. Otherwise, the seals 160 could extend into the ports, potentially damaging the seals.

While each set of axially aligned static and dynamic seals 160 and 162 is preferably formed from two distinct members, the seals 160 and 162 of each set could also be combined to form a single annular member whose inner periphery forms the dynamic seal of the set and whose outer periphery forms the static seal of the set. For instance, the seals 160 and 162 could be formed from the same material and connected to one another by a membrane of the same material. They could also be formed from different materials and connected to one another by an annular member formed from the same material as one of the seals or another material entirely.

Figure 12:
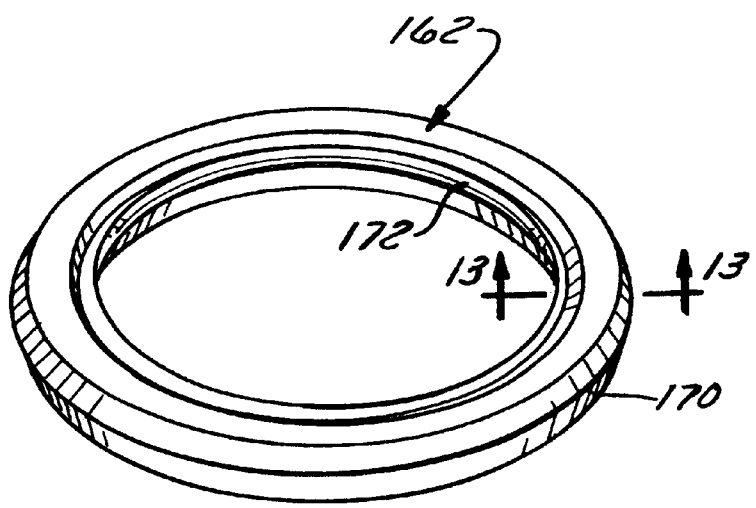
FIG. 12 is a perspective view of one of the dynamic seals of the seal stack.
Figure 13:
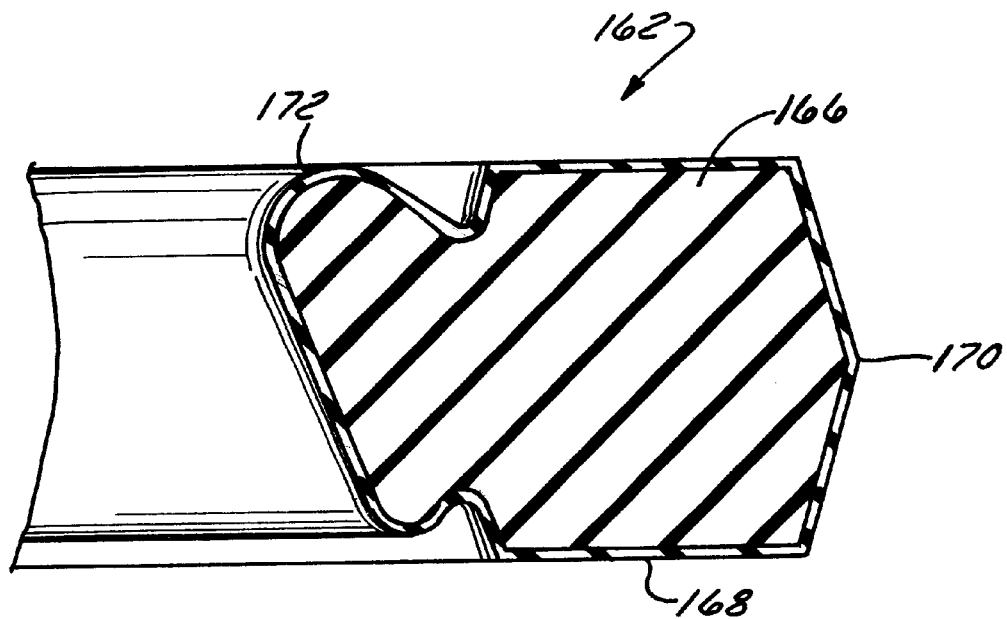
FIG. 13 is a sectional elevation view taken generally along the lines 13—13 in FIG. 12.

The dynamic seals 162 may be formed of natural rubber, synthetic rubber, or any elastomeric material suitable for use in a dynamic seal. As best seen in FIGS. 12 and 13, an especially preferred material is composite material including a core 166 of liquid silicone rubber "LSR" and a thin layer or coating 168 of Paralene C or Paralene N. The seal 162 is not a true ring but instead is generally V-shaped at its outer periphery 170 for seating in the associated seal groove as discussed below. It also has a lip portion 172 at its inner periphery which serves as the actual dynamic sealing surface of the seal 162. The lip portion 172 is asymmetrical about a radial plane bisecting it in order to provide a seal against the piston 74 that is pressure-actuated on the larger lobe of the lip portion 172.

Referring to FIGS. 2 and 4–7, the spacers 164A–164F support the seals 160 and 162 in their spaced-apart relationships. The illustrated embodiment employs four primary spacers 164A–164D that surround the primary piston portion 150, a fifth, stepped spacer 164E that surrounds the outer end of the brine piston portion 152, and a sixth spacer 164F of reduced diameter that surrounds the inner end of the brine piston portion 152. Caps 174 and 176 are clipped onto the ends of the end-most spacers 164A and 164F. A first combined seal 177 is clamped between the fifth and sixth spacers 164E and 164F, and a second combined seal 179 is clamped between the sixth spacer 164F and the cap 176. Both seals 177 and 179 seal against the peripheral surface of the bore 70 at their outer peripheries and against the brine portion 152 of the piston 74 at their inner peripheries. These seals 177 and 179 therefore act as both static seals and dynamic seals.

The fifth spacer 164E tapers from inner to outer axial ends 180 and 181 thereof. An annular shoulder 183, formed near the inner end 181, seats against an axial shoulder 185 of the bore 70 (see FIG. 2) wall to arrest the inner end of the seal stack 76 from additional inward movement when the seal stack 76 is inserted into the bore 70.

The first through fourth spacers 164A–164D are of identical construction except for the fact that the second and third spacers 164B and 164C are of a reduced axial length relative to the first and fourth spacers 164A and 164D to accommodate the associated ports and lands on the bore 70 and the piston 74. The second spacer 164B therefore will be described, it being understood that the same description applies equally to the remaining spacers. Referring to FIGS. 5–11, spacer 164B comprises an injection molded plastic element including inner and outer annular rings 182 and 184 connected to one another by axially-extending posts 186. The posts 186 are injected onto an outer axial surface of the inner annular ring 182 and are affixed to tubular receptacles 188 injected onto the facing inner axial surface of the outer annular ring 184. The inner and outer peripheries of the facing surfaces of the annular rings 182 and 184 of each adjacent pair of annular rings are tapered relative to one another to form seal grooves 190 and 192 for receiving the associated static and dynamic seals 160 and 162. Referring particularly to FIGS. 10 and 11, the walls 194 and 196 of each of the outer seal grooves 190 are tapered relative to a radial plane. As best seen in FIG. 11, the inner wall 194 of each seal groove 190 is inclined less severely relative to the radial plane than the outer wall 196 in order to facilitate release of the associated static seal 160 from the peripheral surface of the bore 70 upon seal stack removal. Preferably, the outer wall 196 is inclined at an angle of more than 45° from the radial plane, and the inner wall 194 is inclined at an angle of less than 45° from the radial plane and preferably less than 30°. An especially preferred relationship is a 45° taper on the outer wall 196 and a 28° taper on the inner wall 194.

Figure 8:
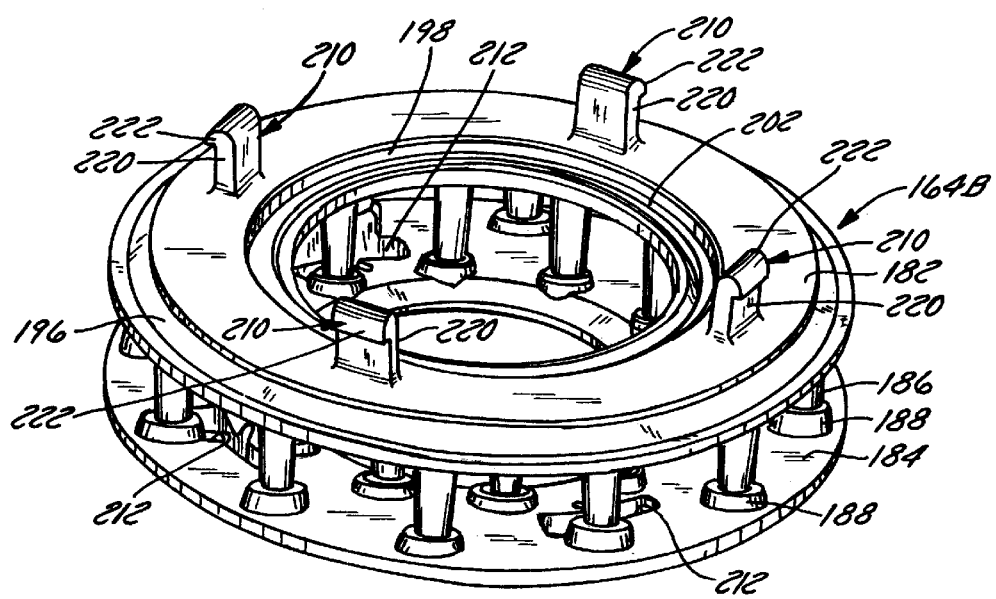
FIGS. 8 and 9 are perspective views of a spacer of the seal stack, viewed from opposite sides of the spacer.
Figure 9:
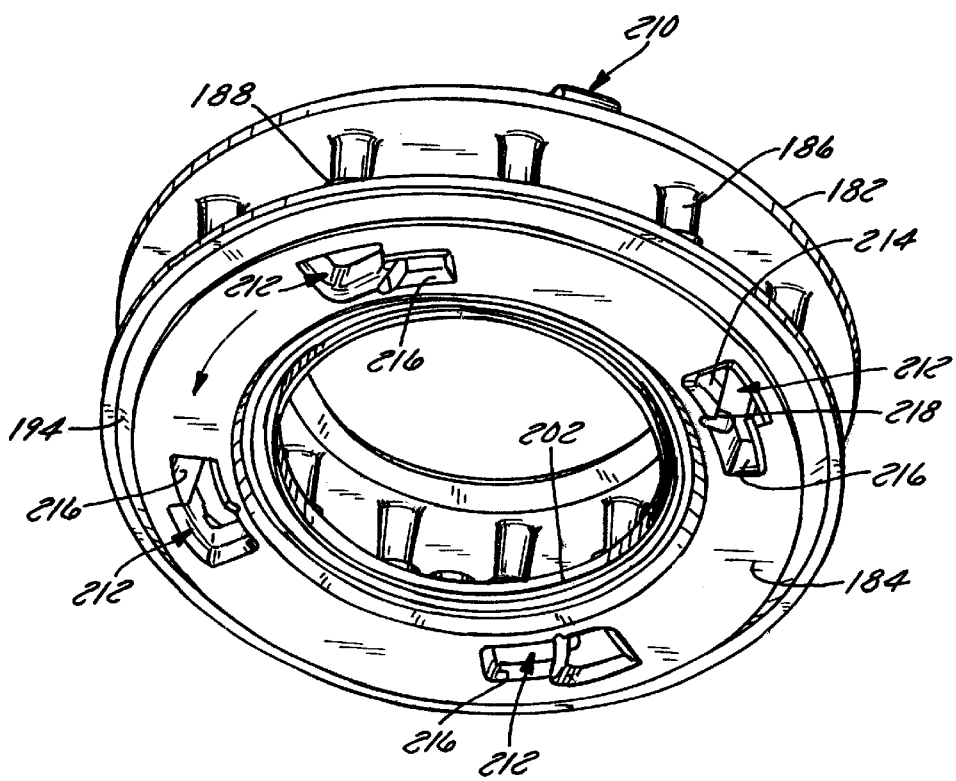

Referring to FIGS. 8–10, the seal groove 192 for each of the dynamic seals 162 is formed from generally C-shaped notches 198 and 200 in the facing inner peripheries of the adjacent spacers 182 and 184. The axial surface of each of the notches 198 and 200 has one or more annular ribs 202 that engage the associated dynamic seal 162 to help hold the associated dynamic seal in place during sliding motion of the piston 74 against the seal 162 and to help the seal 162 seal against the notches 198 and 200. This action is necessary to keep the dynamic seal 162 in place as it moves back and forth across the bore 70. This can be a difficult task given that the seal 162 may experience up to a 125 psi pressure differential thereacross during normal operation in addition to dynamic forces imposed by water flowing past it at rates up to 30 gallons per minute. However, the retention forces should not be so strong that the seals 162 are unnecessarily deformed. It has been found that adequate retention forces are obtained by providing the ribs 202 on the notches 198 and 200 in combination with the mating relationship between the generally V-shaped outer peripheral surface 170 of the seals 162 and a mating surface formed by the outer periphery of the seal groove 192.

The first through fifth spacers 164A–164E and the associated seals 160 and 162 are arranged relative to one another to facilitate insertion and removal of the seal stack 76 into and from the bore 70 while assuring tight static and dynamic seals when the valve 26 is assembled. This goal is achieved by configuring the seal stack 76 to be compressible axially upon valve assembly. Axial compression of the seal stack 76 causes the static seals 160 to expand radially to first initiate and then enhance sealing contact between the static seals 160 and the peripheral surface of the bore 70 and the outer seal grooves 190. The seal stack 76 also is configured to expand axially upon initial removal of the seal stack 76 from the bore 70 to permit the static seals 160 to constrict radially to diminish sealing contact between the static seals 160 and the peripheral surface of the bore 70, thereby releasing the static seals 160 from the peripheral surface of the bore 70 and facilitating further removal of the seal stack 76 from the bore 70.

Towards these ends, at least some of the spacers 164A–164E are connected to one another via a lost motion connector that permits the spacing between adjacent spacers to vary, hence selectively compressing and releasing the seals 160 clamped between each adjacent pair of spacers. Lost motion may, for example, be accommodated by a deflectable snap mechanism. In the illustrated embodiment, each lost motion connector comprises a plurality of hooks 210 extending axially inwardly from the inner ring 182 of one of the spacers and a corresponding plurality of receptacles 212 located in the outer ring 184 of the adjacent spacer. Four equally-spaced hooks 210 and corresponding receptacles 212 are provided on each set of mating spacers in the illustrated embodiment. Each of the receptacles 212 comprises an arcuate slot formed in the ring 184 and having a receptacle portion 214 and a latching portion 216 that is of a reduced radial width when compared to that of the receptacle portion 214. Each of the receptacles 212 also has a detent 218 at an inner radial periphery thereof that hinders unintended disassembly of the seal stack 76. The hooks and receptacles could be replaced by other mating latch structures such as headed posts and stepped-diameter slots.

As best seen in FIG. 10, each hook 210 is generally J-shaped, having an axial leg portion 220 and a radial latch portion 222 located on the distal end of the of the leg portion 220 and configured to engage the axial outer surface of the inner ring 184 of the adjacent spacer. Each leg portion 220 is substantially longer than the thickness of the associated inner ring 184, thereby leaving a potential gap G between the latch portion 222 and the inner ring 184 when the adjacent rings 184 and 182 are pressed flat against one another as seen in FIG. 10. The accumulated thickness of the gaps of all of the lost motion connectors defines the maximum possible compression of an assembled seal stack 76. In the illustrated embodiment in which each gap G is approximately 0.05" wide, the maximum compression of the seal stack 76 is about 0.25". The relative diameters of the seal grooves 190 and the static seals 160 are set such that, upon this maximum seal stack compression, each static seal 160 expands about 0.03" radially. This substantial expansion permits the diameter of the bore 70 to be substantially greater than the unexpanded diameter of the static seals 160, permitting the seal stack 76 to be easily inserted into and removed from the bore 70 in its uncompressed state without having to carefully dimension the diameter of the bore 70 relative to the diameter of the seals 160.

The seal stack 76 is assembled and inserted into the bore 70 in the following process. First, for each successive pair of spacers (e.g., 164A and 164B or 164B and 164C), the dynamic seal 162 associated with that pair are placed on one of the walls of the associated seal groove 192, and the static seal 160 is slipped over the spacer next to the associated seal groove 190. (The static seal cannot be easily prepositioned in the seal groove 190 because it is undersized relative to the diameter of the seal groove 190 in order to facilitate seal stack expansion and contraction) The hooks 210 on the outer spacer are then inserted into the receptacle portions 214 of the receptacles 212 of the inner spacer of the pair. The spacers are then rotated relative to one another as represented by the arrow in FIG. 9 to position the hooks 210 in the latching portions 216 of the receptacles 212, thereby latching the spacers together. This process is repeated for each spacer. The static seals 160 are then turned or slipped into the associated seal grooves 190 between the adjacent spacers, thereby completing the preassembly process. This preassembly operation negates the need to attempt to properly position the seals 160, 162, 177, and 179 directly in the bore 70, preventing the seals from being twisted, mislocated, or cut during the remainder of the assembly process.

The preassembled seal stack 76 is then inserted into the bore 70 so that the annular shoulder 183 on the fifth spacer 164E rests on the axial shoulder 185 on the bore periphery as seen in FIG. 2. The spacer ring 164E also engages a flange 181 on the valve housing at this time. The ample radial clearance between the static seals 160 and the peripheral surface of the bore 70 permits this insertion to be performed with little effort. The preferred method of assembly is to reach through the center of the dynamic seals 162 and push on the closed surface of a leading spacer 164E rather than pushing on the spacer ring. This motion forces the stack 76 to remain axially expanded during the insertion process and facilitates insertion. Then, the cap/piston assembly 74, 78 is inserted into the open end of the bore 70 so that the piston 74 slides through the seal stack 76 and the external threads on the cap 78 mate with corresponding internal threads in the valve body 44. The cap 78 is then screwed into the valve body 44 so that inner boss 224 and 224A of the cap 78 engage the outer end 174 of the seal stack 76 and axially compresses the seal stack 76 against the shoulder 185 of the bore 70. The static seals 160 are compressed axially and, accordingly, expand radially during this compression to first initiate and then improve sealing contact between the static seals 160 and the peripheral surface of the bore 70 and to seal against at least one seal groove of the associated spacers. The relative positions of the spacers is defined by the physical relationships of the spacers themselves, not the seals between them. Otherwise differential pressures across the spacers could cause additional relative movement of the spacers within the bore, displacing the seals and abrading them. This seal abrasion is avoided by the illustrated spacer design. This relationship also prevents movement of the sealing point for the piston.

Seal stack removal takes place in essentially the reverse operation. The cap/piston assembly 74, 78 is simply unscrewed from the bore 70 and removed, thereby removing the compressive retention forces from the seal stack 76. The seal stack 76 is then simply gripped and removed from the bore 70 from the outer end. This removal is facilitated by the sequential movement of the lost motion connectors. That is, the combined gripping forces imposed on the peripheral surface of the bore 70 by all of the static seals 160 are substantial and can be very difficult to overcome. However, the lost motion connectors permit the much smaller gripping forces of the individual static seals 160 to be overcome sequentially. For instance, the second spacer 164B remains in place upon initial outward movement of the first or outermost spacer 164A of the seal stack 76 relative to the second spacer 164B. The static seal 160 between the spacers 164A and 164B constricts radially upon this relative movement to diminish sealing contact between the static seal 160 and the peripheral surface of the bore 70 to facilitate further removal of the seal stack 76 from the bore 70. Seal release is also facilitated by the asymmetric taper of the walls 194 and 196 of the seal groove 190, which prevents the seal 160 from wedging against the peripheral surface of the bore 70 when the second spacer 164B begins to move. Then, after the first seal has released and the lost motion afforded by the lost motion connection between the first and second spacers 164A and 164B is taken up, the first spacers 164A, 164B and the associated seal move outwardly without any resistance from the seal. Even if the seal 160 between the first and second spacers 164A and 164B remains in gripping contact with the bore 70 after the first spacer 164A begins to move, the relatively high retention forces of only that seal must be overcome during the next phase of seal stack removal. The next seal does not impose any resistance to motion because the lost motion between the second and third spacers 164B and 164C is merely being taken up at this time. This effect is illustrated in FIG. 10, which shows the seal 160 between the fourth and fifth spacers 164D and 164E in its compressed state and the remaining seals 160 in their released state. Even after the lost motion connection between the second and third spacers 164B and 164C is taken up and the associated seal begins to resist additional motion of the seal stack 76, much lower resistance is provided to seal stack motion by the already-moving seals than would be imposed if all seals had to be broken loose from the bore 70 simultaneously. Hence, although the overall resistance to seal stack removal may increase throughout the removal process, the much greater removal forces required to break the stationary seals loose from the bore 70 are overcome sequentially rather than all at once. The aggregate resistance to seal stack removal therefore is rather small when compared to a comparable seal stack lacking lost motion connectors between adjacent sections of the stack.

4. Operation of the Water Softener

The water softener control valve 26 operates in a sequence that includes at least a fill phase and a regeneration phase. It may also include a backwash phase and/or a rinse phase. The preferred sequence will now be discussed.

Figure 14:
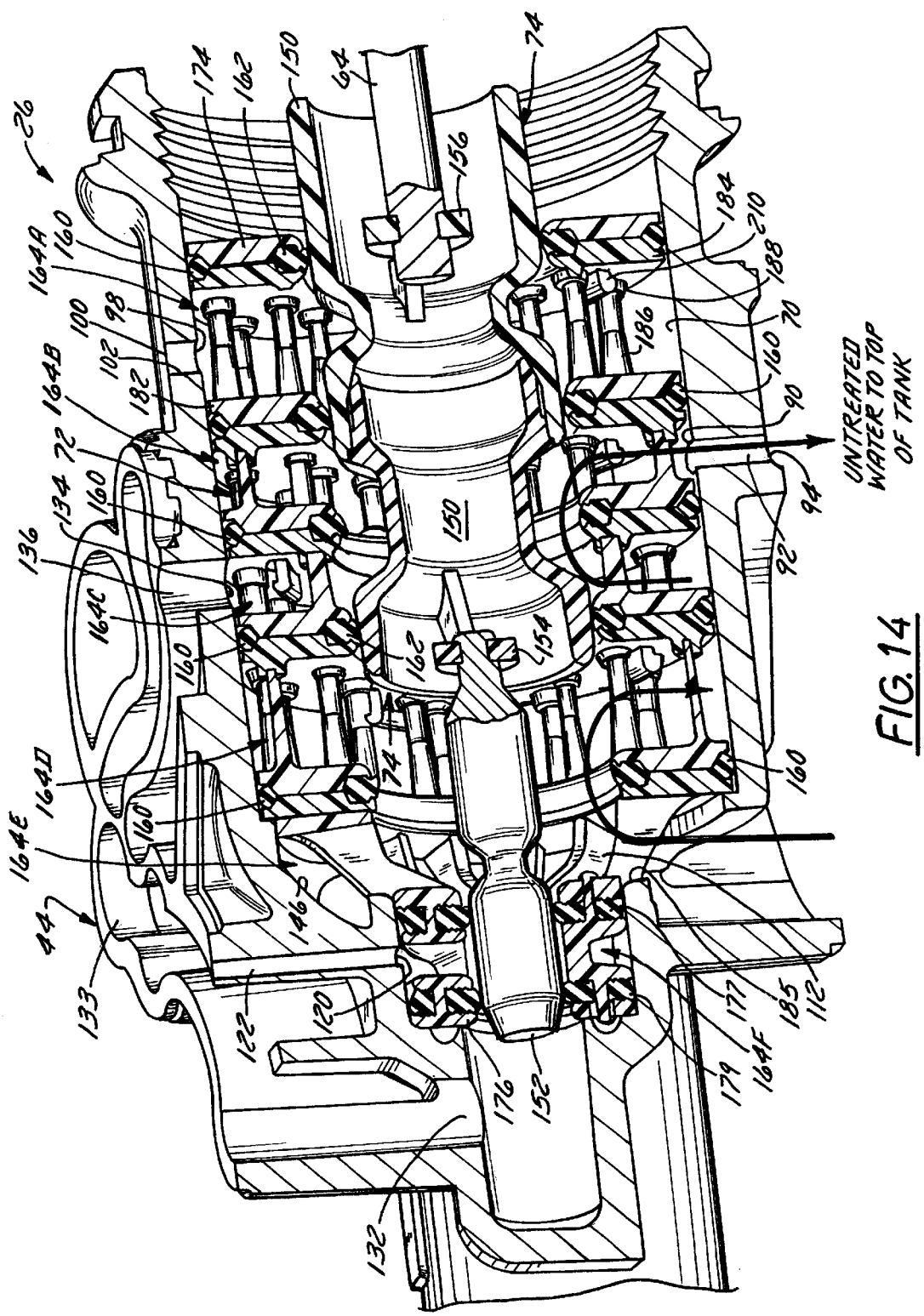
FIGS. 14–18 are a series of sectional partially schematic elevation views showing an operational sequence of the control valve.

The valve 26 normally assumes the service position illustrated in FIG. 14, in which the untreated water inlet port 82 is connected to the top-of-tank port 90, and in which the distribution port 112 is connected to the treated water outlet port 108. The brine port 120 is isolated from the other ports due to the sealing of both combined seals 177 and 179 against a first land on the brine portion 152 of the piston 74. In this configuration, water flows from the untreated water inlet port 82, through the resin tank 22, and to the service port 108 of the valve body 44, thereby treating the water by ion exchange.

A regeneration cycle is initiated when the system determines that the ion exchange capacity of the resin bed 36 will be exhausted in a designated period such as within the next day. This decision may be based on the time since the last regeneration cycle and/or sensed usage and/or other factors. To initiate a regeneration cycle, the motor 302 (FIGS. 3A and 19) drives the rod 64 to the left as seen in the drawings from the service position illustrated in FIG. 14 to a fill position illustrated in FIG. 15. After this movement, the untreated water inlet port 82 remains in communication with the top-of-tank port 90, and the distribution port 112 is connected to both the treated water outlet port 108 and the brine port 120. As a result, treated water flows both to the treated water outlet port 108 and into the brine tank 24, thereby filling the brine tank 24 with treated water to dissolve some of the particles 38 in the brine tank 24 to form a regenerant solution 39.

Figure 16:
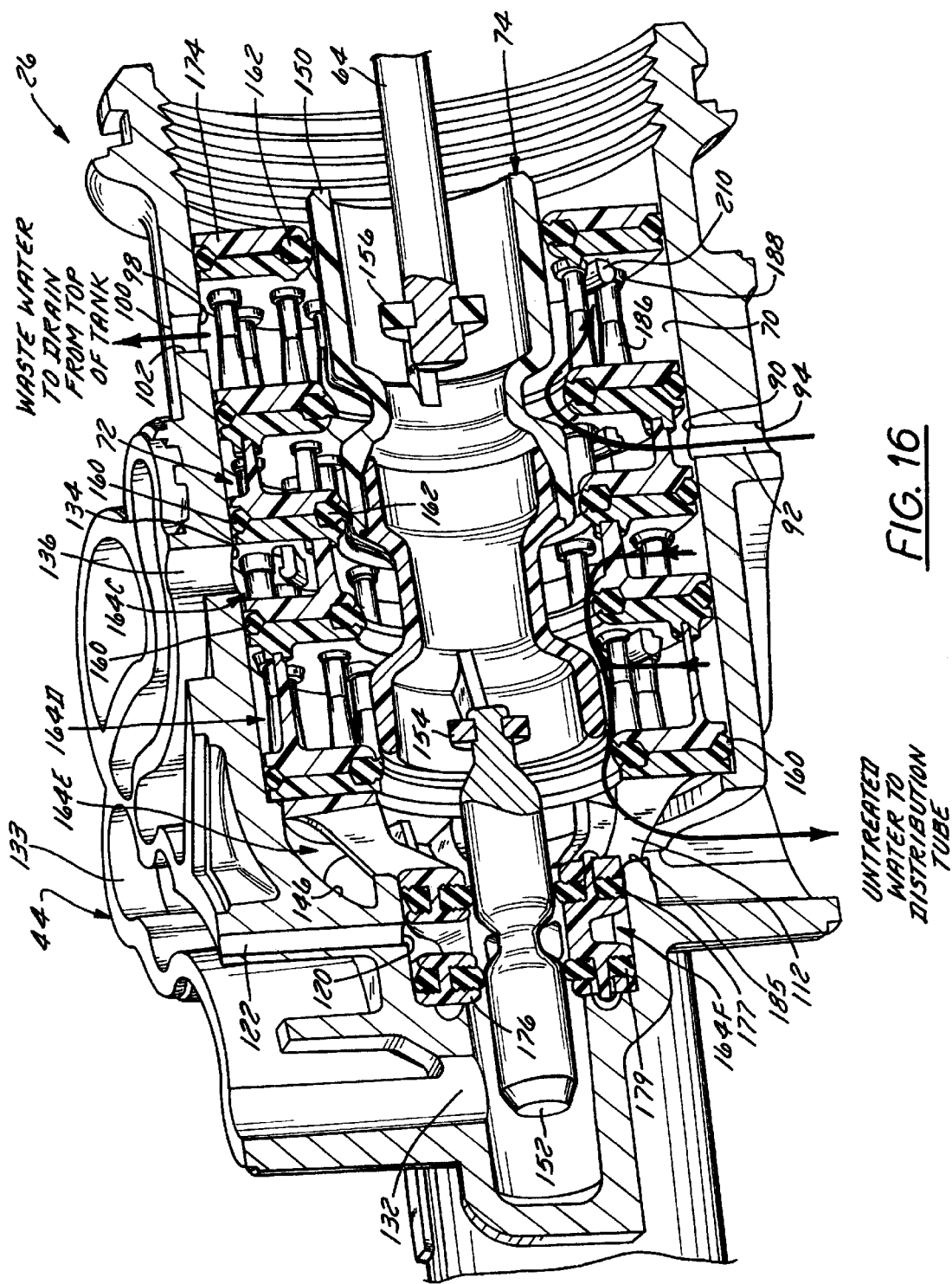

When the fill phase of the cycle is completed, the rod 64 drives the piston 74 axially to a backwash position illustrated in FIG. 16, in which the top-of-tank port 90 is connected to the drain port 98 and the untreated water inlet port 82 is connected to both the treated water outlet port 108 and to the distribution port 112, thereby backwashing the resin tank 22 with untreated water while continuing to supply untreated water to the treated water outlet. This backwashing flushes trapped particulate matter from the resin bed 36, thereby facilitating subsequent fluid flow from the bed 36 and enhancing the bed's ability to treat the water.

Figure 17:
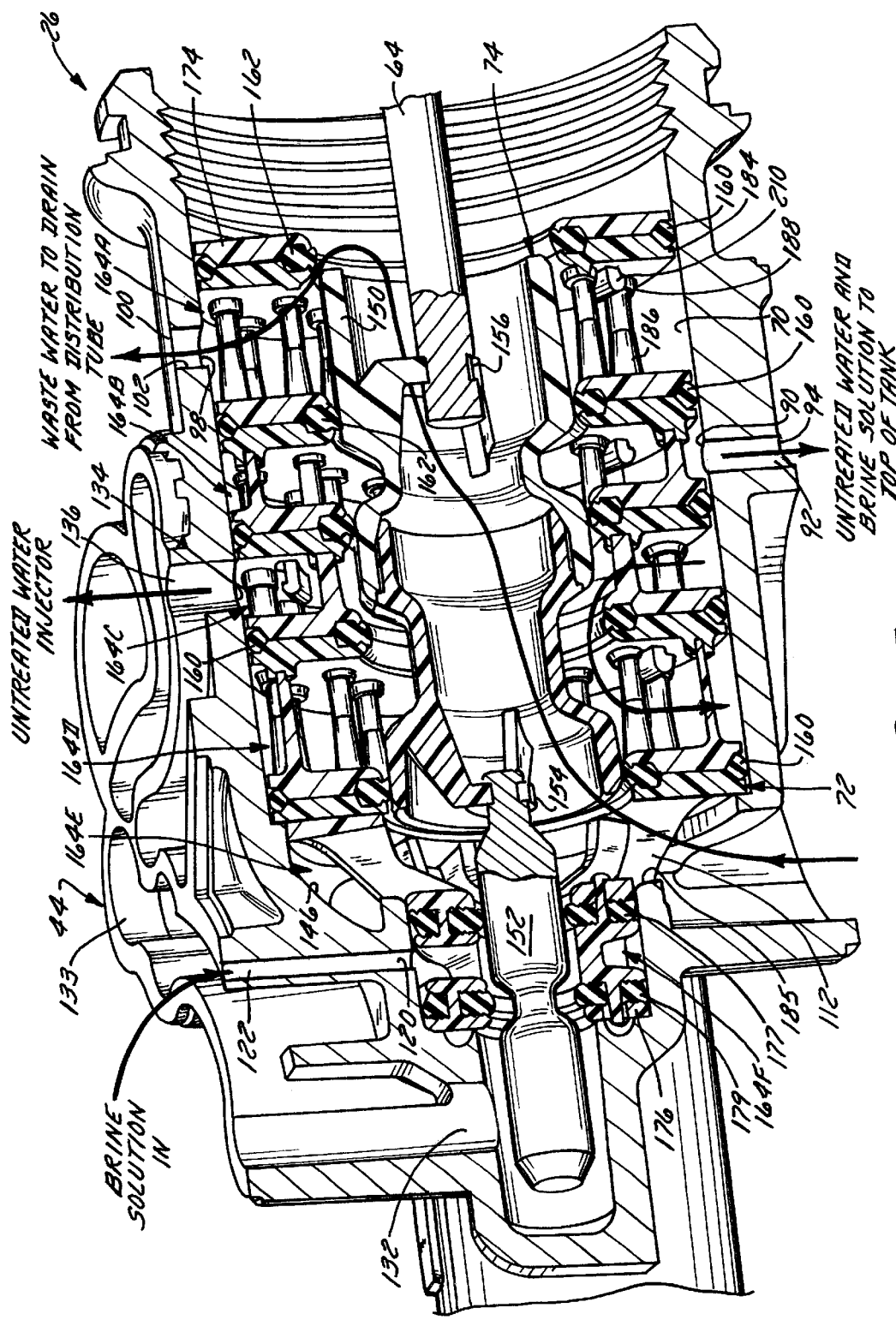

After the backwash phase, the rod 64 drives the piston 74 to a regeneration position illustrated in FIG. 17, in which the inlet port 82 is connected to the treated water outlet port 108, the brine port 120 is connected to the top-of-tank port 90 via the injector 66, and the distribution port 112 is connected to the drain port 98. In this position, the water flowing into the injector 66 from the untreated water inlet port 82 siphons a regenerant solution 39 from the brine tank 24 and forces it through the resin bed 36 from above and to drain, thereby flushing the resin tank 22 with the regenerant solution 39 to regenerate the resin bed or other treatment medium by replacing the objectionable ions such as calcium ions in the exhausted resin bed 36 with less objectionable ions such as sodium ions. As discussed above, this operation is called downflow regeneration because the regenerant solution enters the resin tank 22 from the top and is drawn out via the distribution tube 42. Alternatively, if the valve 26 were to be configured for upflow regeneration, the plug 142 and the injector 66 would be substituted for one another, thereby connecting the brine port 120 to the distribution port 112. The regenerant solution 39 would then flow into the bottom of the resin tank 22 from the bottom of the distribution tube 42 and would exit the top of the resin tank 22 and flow to drain.

Figure 18:
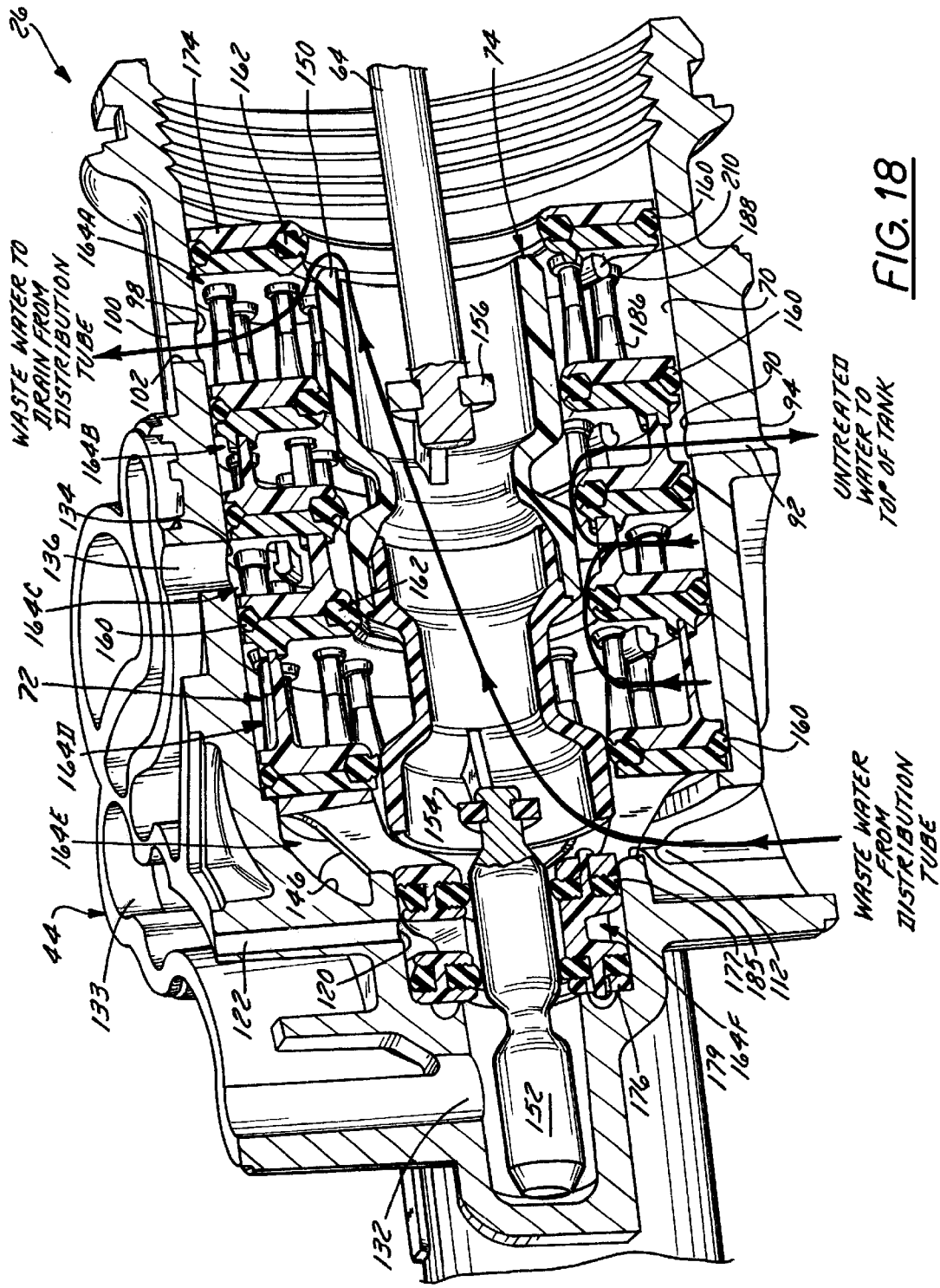

After the regeneration phase of the cycle is complete, the rod 64 drives the piston 74 to the fast rinse position seen in FIG. 18 in which the untreated water inlet port 82 is connected to the treated water outlet port 108 and the top-of-tank port 90 and in which the distribution port 82 is connected to the drain port 98, thereby rinsing the resin tank 22 with untreated water to remove the regenerant solution 39 from the resin tank 22. The resin bed 36 is now fully-regenerated and ready to resume water treatment. The drive rod 64 then returns the piston 74 to the service position illustrated in FIG. 14 to resume normal operation of the water softener.

5. Construction and Operation of Drive Arrangement

Figure 3A:
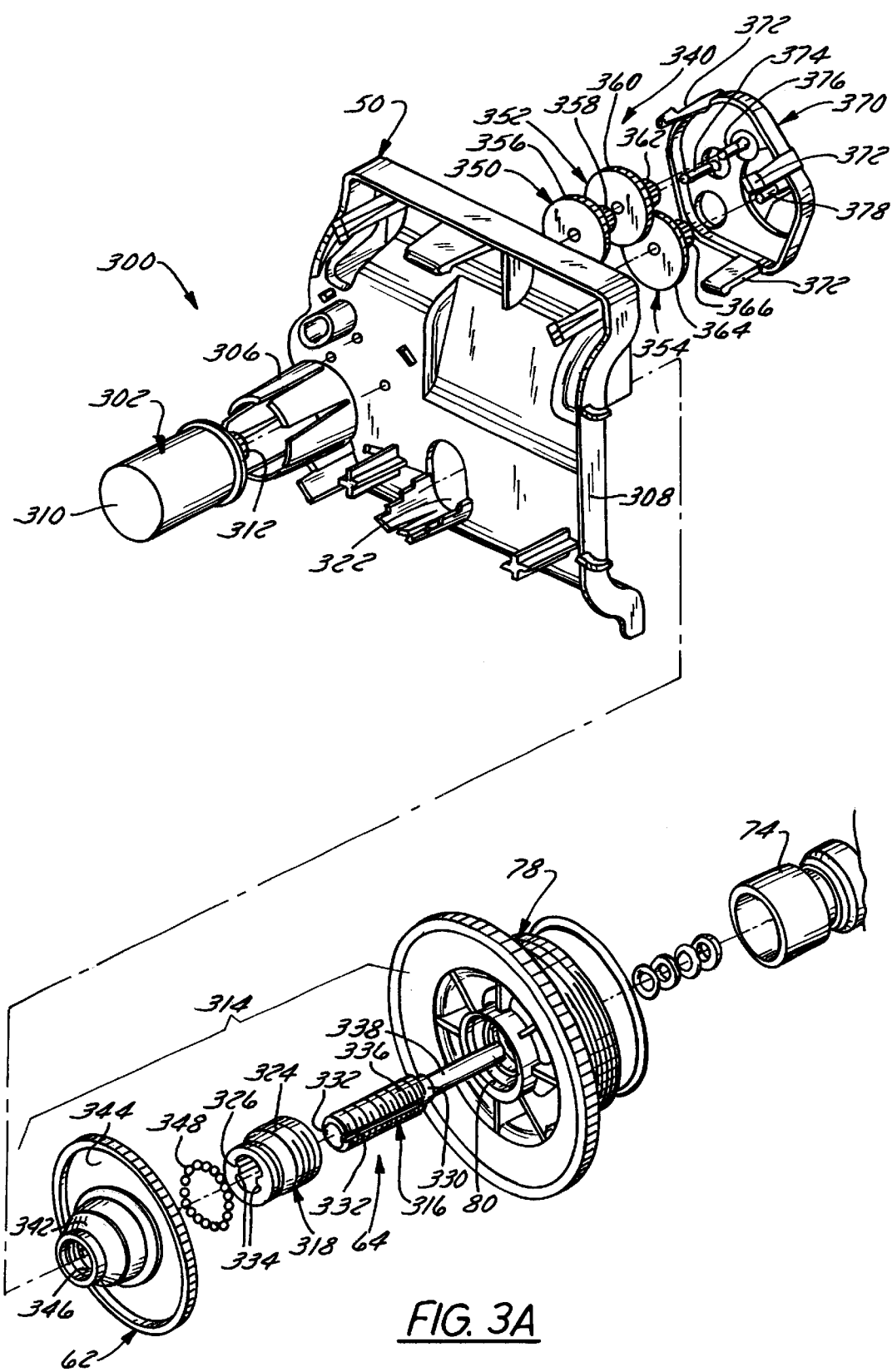
FIG. 3A is an exploded perspective view of a drive arrangement for the control valve.
Figure 4:
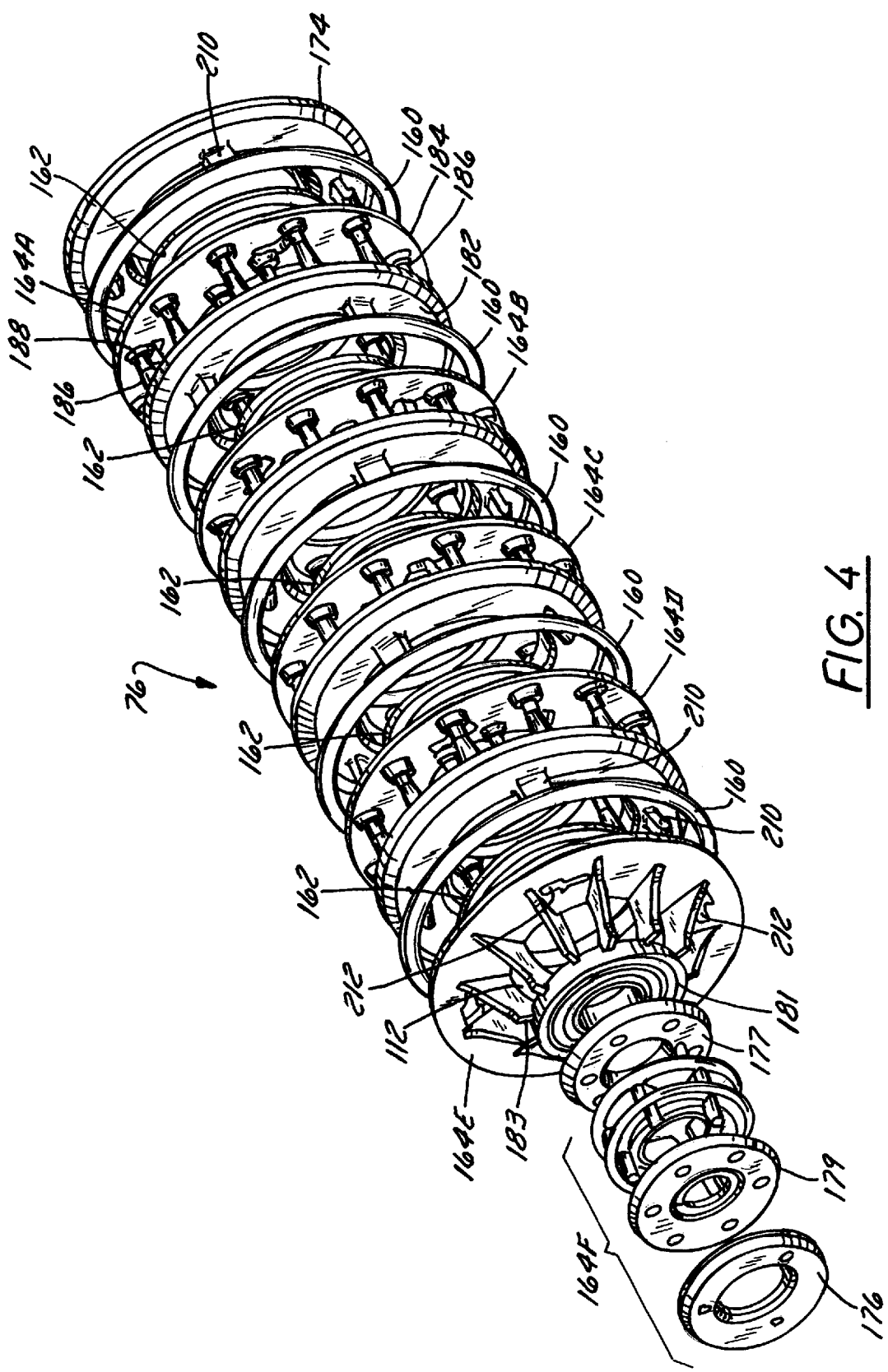
FIG. 4 is an exploded perspective view of a seal stack of the control valve.
Figure 6:
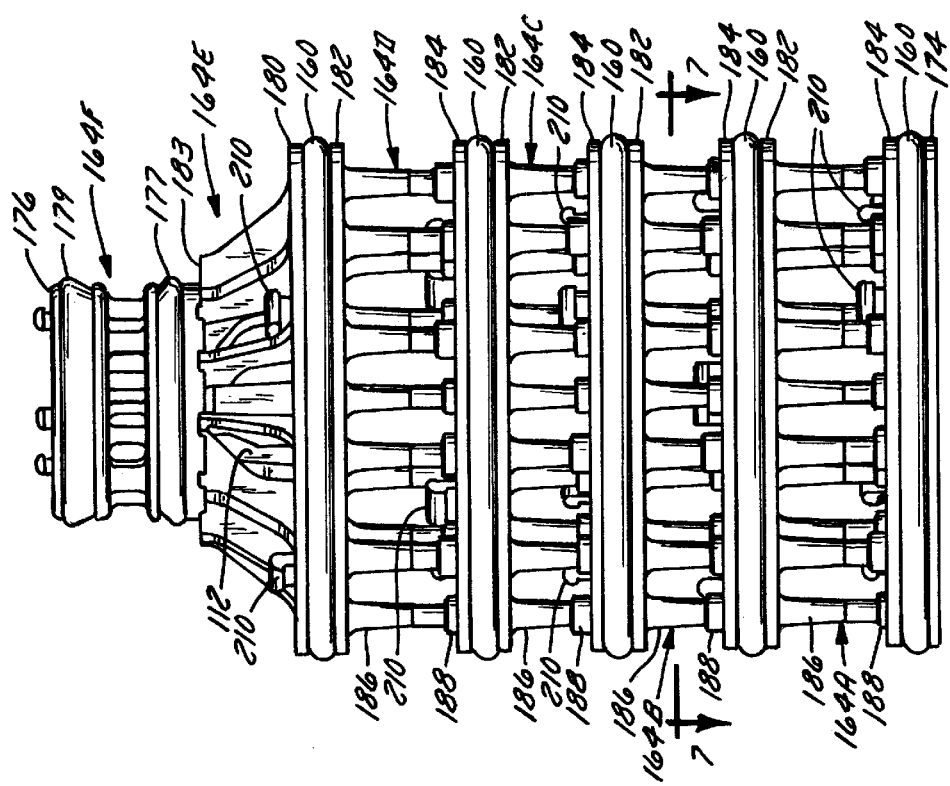
FIG. 6 is an elevation view of the seal stack.
Figure 5:
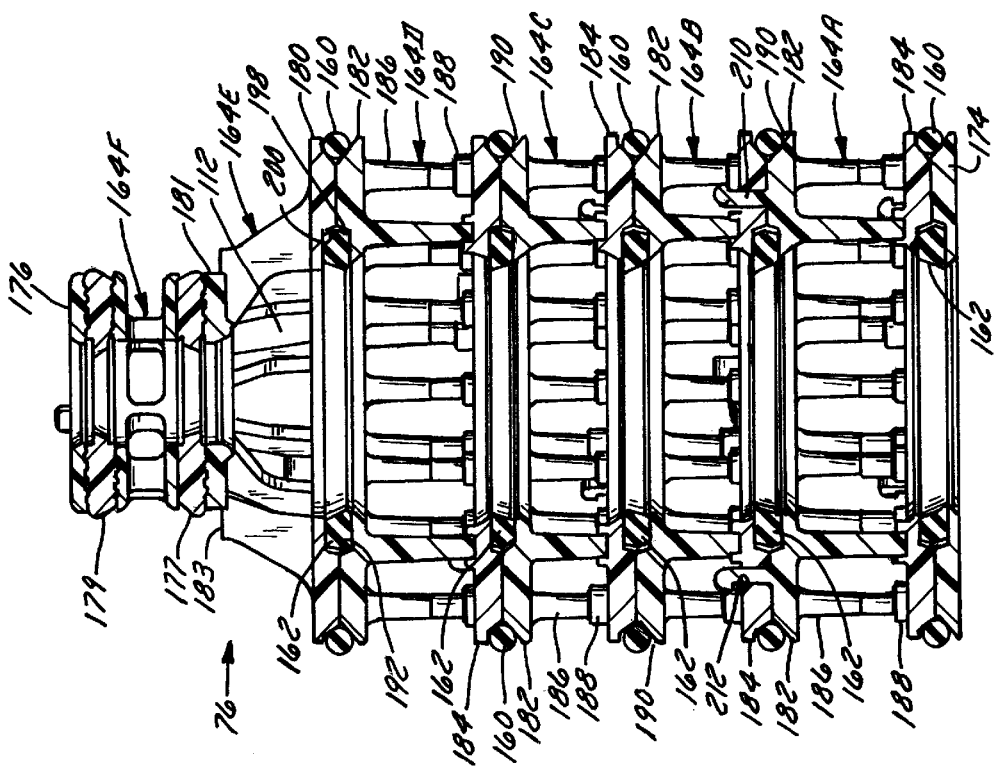
FIG. 5 is a sectional elevation view of the seal stack of FIG. 4.
Figure 7:
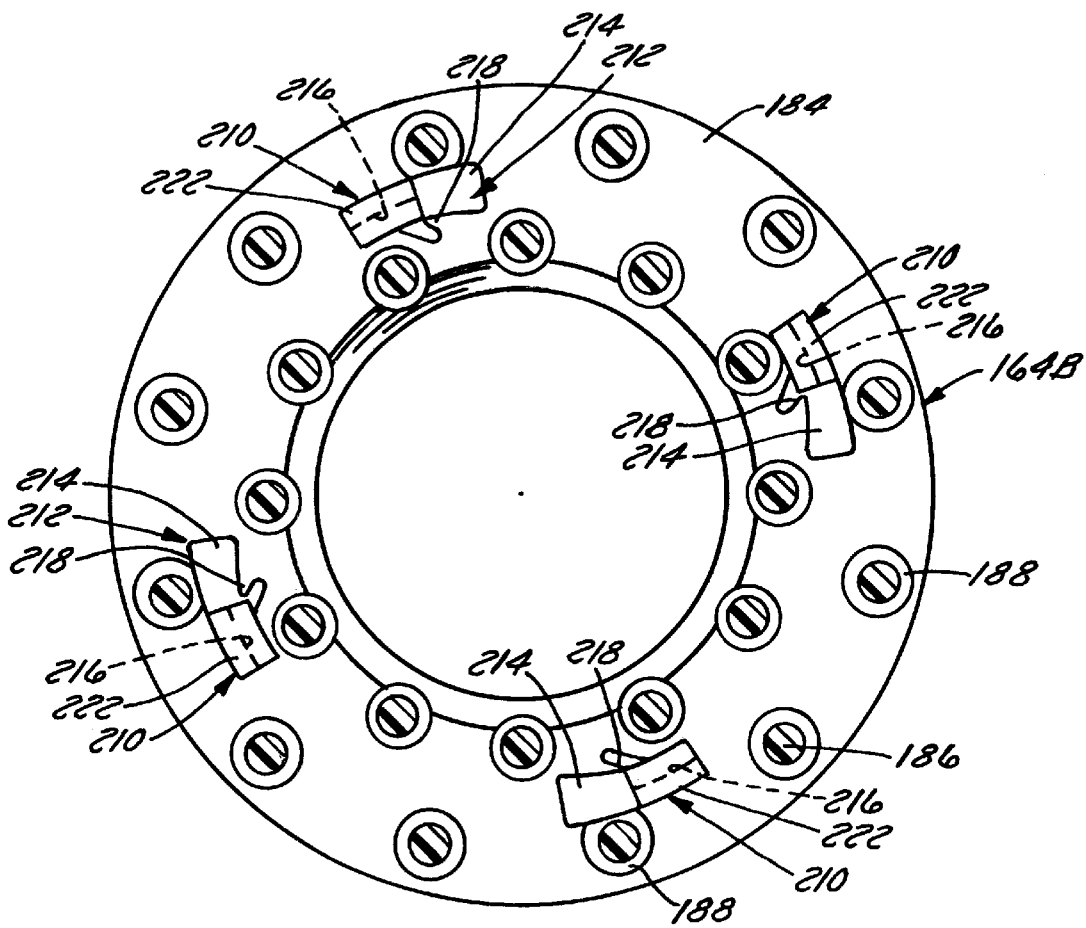
FIG. 7 is a sectional plan view taken generally along the lines 7—7 in FIG. 6.
Figure 19:
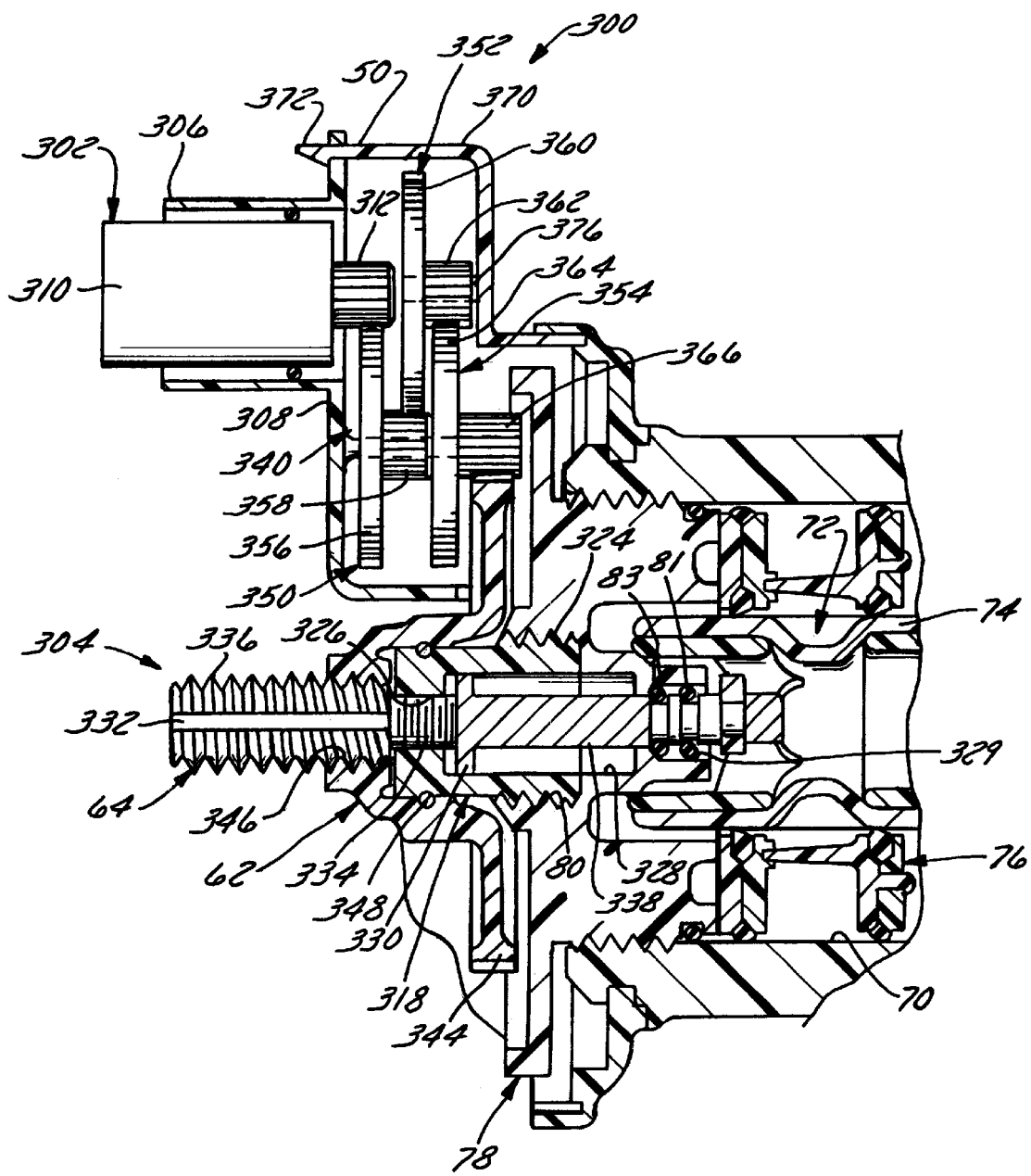
FIG. 19 is side sectional elevation view of the drive arrangement of FIG. 3A and of the cooperating portions of the control valve.

Referring now to FIGS. 3a and 19, a drive arrangement 300 is illustrated for driving the threaded shaft or drive rod 64 and the piston 74 of the valve element 72 to reciprocate linearly relative to the bore 70. The drive arrangement 300 is configured 1) to translate the piston 74 without imparting any side load to the support structure for the drive rod 64 or its accompanying seals, 2) to permit the piston 74 to be reciprocated within the bore 70 so as to meet the needs of a particular application, and 3) so as to permit the operation of the control valve assembly 26 to be varied in response to changing circumstances such as the encountering of an obstruction or a piston sticking condition. Towards these ends, the drive arrangement includes an electric motor 302 and a motion converter 304. The motion converter 304 has 1) an input element coupled to an output element of the motor 302 and 2) an output element configured for direct or indirect connection to the drive rod 64.

Figure 20:
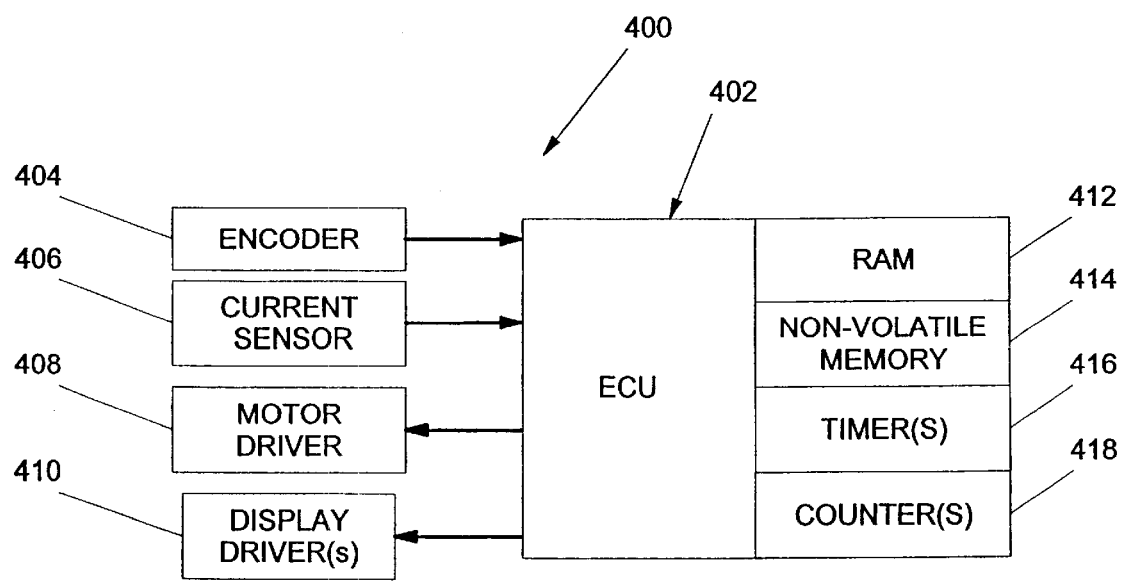
FIG. 20 is a schematic representation of a controller for the motor of the drive arrangement of FIGS. 3A and 19 and of the associated drivers and sensors.

The electric motor 302 may comprise any of a number of reversible motors and preferably has variable torque capability. For instance, the motor could comprise an asynchronous AC motor or a stepper motor. In the preferred embodiment, the motor 302 comprises a reversible electric DC motor because a reversible DC motor is easier to control than an asynchronous AC motor and less expensive than either an asynchronous AC motor or a stepper motor. The motor 302 is disposed in a receptacle 306 on a rear wall 308 of the controller module 50. The motor 302 includes a casing 310 and a rotary output element in the form of a pinion 312 extending rearwardly from the casing 310. The motor casing 310 is mounted in the receptacle 306 such that the pinion 312 extends through the rear wall 308 of the module 50 and towards the valve cap 78. The motor 302 is supplied with electric drive current via a driver 408 and controller 402, detailed below in connection with FIG. 20.

The motion converter 304 may comprise any of a number of devices that converts the rotary motion of the pinion 312 or other output element of the motor 302 to reciprocating linear motion of the piston 74 without imparting any side load to the support structure for the piston's drive rod 64 or its associated seals. In the illustrated and preferred embodiment, the motion converter 304 includes at least a lead screw assembly 314 and may additionally include a gear train 340 coupling the lead screw assembly 314 to the pinion 312. It includes the externally threaded drive rod or shaft 64 (mentioned in Section 2 above), a support bushing 318, and the driven gear 62 mentioned in Section 2 above. The outer end of the lead screw assembly 314 extends through and is supported on an opening 322 in the module rear wall 308. The threaded shaft 64, which forms the output element of the lead screw assembly 314, is configured to move linearly along an axis that is coaxial with the piston 74 and the bore 70. All moving components preferably are made of relatively durable plastic materials. For example, the drive rod 64 could be made from PPS, and the support bushing 318 could be made from acetal.

The support bushing 318 has an externally threaded inner end 324 that is fixed to the valve cap 78, e.g., by being screwed into mating internal threads in the bore 80 of the valve cap 78 as illustrated or by being formed integrally with the valve cap 78. A bore 326 extends axially through the support bushing 318 and is enlarged at an outer portion 328 to receive the threaded shaft 64. The shaft 64 extends through the bore 326 in the support bushing 318 and has grooves 332 thereon that slidably receive opposed splines 334 in the support bushing 318 so as to prohibit rotation of the shaft 64 relative to the support bushing 318 while permitting relative axial movement therebetween. An outer end 336 of the shaft 64 is threaded. An inner end 338 of the shaft 64 is affixed to the piston 74 and is sealed to an innermost end portion 329 of the bore 326 by seals 81 and 83. In this way, when the gear 62 is driven to rotate by the motor 302 and gear train 340 (detailed below), the threaded shaft 64 translates linearly through the stationary support bushing 318, hence driving the piston 74 to move linearly within the bore 70 without imposing any significant side load on the fore portion 329 forming the support structure for the shaft 64 or on the associated seals 81 and 83.

The driven gear 62 is mounted over the support bushing 318. It includes a central hub portion 342 and a gear portion 344 extending outwardly from an axially inner end of the hub portion 342. A threaded bore 346 is formed axially through the hub portion 342 and is configured to engage the external threads on the outer end 336 on the shaft 316. Rotation between the rotatable driven gear 62 and the fixed support bushing 318 is facilitated by a bearing 348 disposed between the outer periphery of the support bushing 318 and the inner periphery of the driven gear hub portion 342.

Because the driven gear 62 is mounted coaxially on the threaded shaft 64, the threaded shaft 316 and piston 74 are driven to linearly reciprocate without imparting any side load to the support structure for the threaded shaft 64 or the associated seals.

The gear train 340 may comprise any structure for transferring torque from the pinion 312 of the motor 302 to the driven gear 62. It may be eliminated entirely in some applications in which the pinion 312 of the motor 302 is positioned for direct contact with the driven gear 62. In the illustrated embodiment, the gear train 340 includes first, second and third stepped gears 350, 352, and 354, each of them having an input portion of a relatively large diameter and an output portion of a relatively small diameter. Specifically, the first gear 350 has an input portion 356 that is driven by the pinion 312 of the motor 302 and an output portion 358 that drives an input portion 360 of the second gear 352. An output portion 362 of the second gear 352 drives an input portion 364 of the third gear 354. Finally, an output portion 366 of the third gear 354 drives the driven gear 62 forming the input element of the lead screw assembly 314. The gear train 340 is supported on the module 50 via a bracket 370 that is clipped to the module front wall 308 by snap-clips 372. Spindles 374, 376, and 378 extend outwardly from the bracket 370 for supporting the first, second, and third gears 350, 352, and 354, respectively.

The drive arrangement 300 is controlled by a control system that monitors motion of the piston 74 (either directly or indirectly) and that controls operation of the motor 302 based at least in part on information concerning the current position of the piston 74. One such control system 400 is illustrated schematically in FIG. 20. Control system 400 includes an electronic controller or ECU 402, a position monitor 404, and a motor driver 408. The motor driver 408 may include an internal current limiter for controlling the available drive current for the motor 302 and for permitting the controller 402 to determine whether the motor driver 408 is limiting the drive current for the motor 302. Other sensors 406 may be provided for monitoring other operational characteristics of the water softener 20, and other drivers such as display drivers 410 may be provided for supplying power to visual and/or audio displays (not shown).

The position monitor 404 may comprise any device for precisely and directly or indirectly monitoring movement of the piston 74 so as to permit the controller 402 to determine the piston's position within the bore 70. If the motor 302 is a stepper motor, the position monitor could be formed from part of the motor's internal control circuitry (if the motor is sophisticated one) or could take the form of a limit switch or other mechanical position switch (if the motor is a less sophisticated one). In the illustrated embodiment in which the motor 302 comprises a reversible DC motor, the position monitor 404 preferably comprises an encoder, such as a magnetic or optical pick-up device that monitors rotation of one of the rotational elements disposed between the motor 302 and the threaded shaft 316. The illustrated pick-up device monitors rotation of one of the gears (e.g., gear 352) of the gear train 340 and delivers a predetermined number of pulses to the controller 402 for each revolution of the gear.

The controller 402 may comprise any device capable of receiving the signals from the encoder 404 and other sensors 406 and of transmitting control signals to the motor driver 408 and other drivers 410. In the illustrated embodiment, the controller 402 includes a RAM 412, a non-volatile memory 414 such as a EEPROM or a ROM, timer(s) 416, and counter(s) 418. The counter(s) 418 is/are operable to count pulses generated by the encoder 404 and possibly other sensors, and the controller 402 is operable to determine piston displacement by tallying the counted number of pulses. The resultant signal can be used to keep track of piston position at any given time and to precisely control piston movement.

Figure 15:
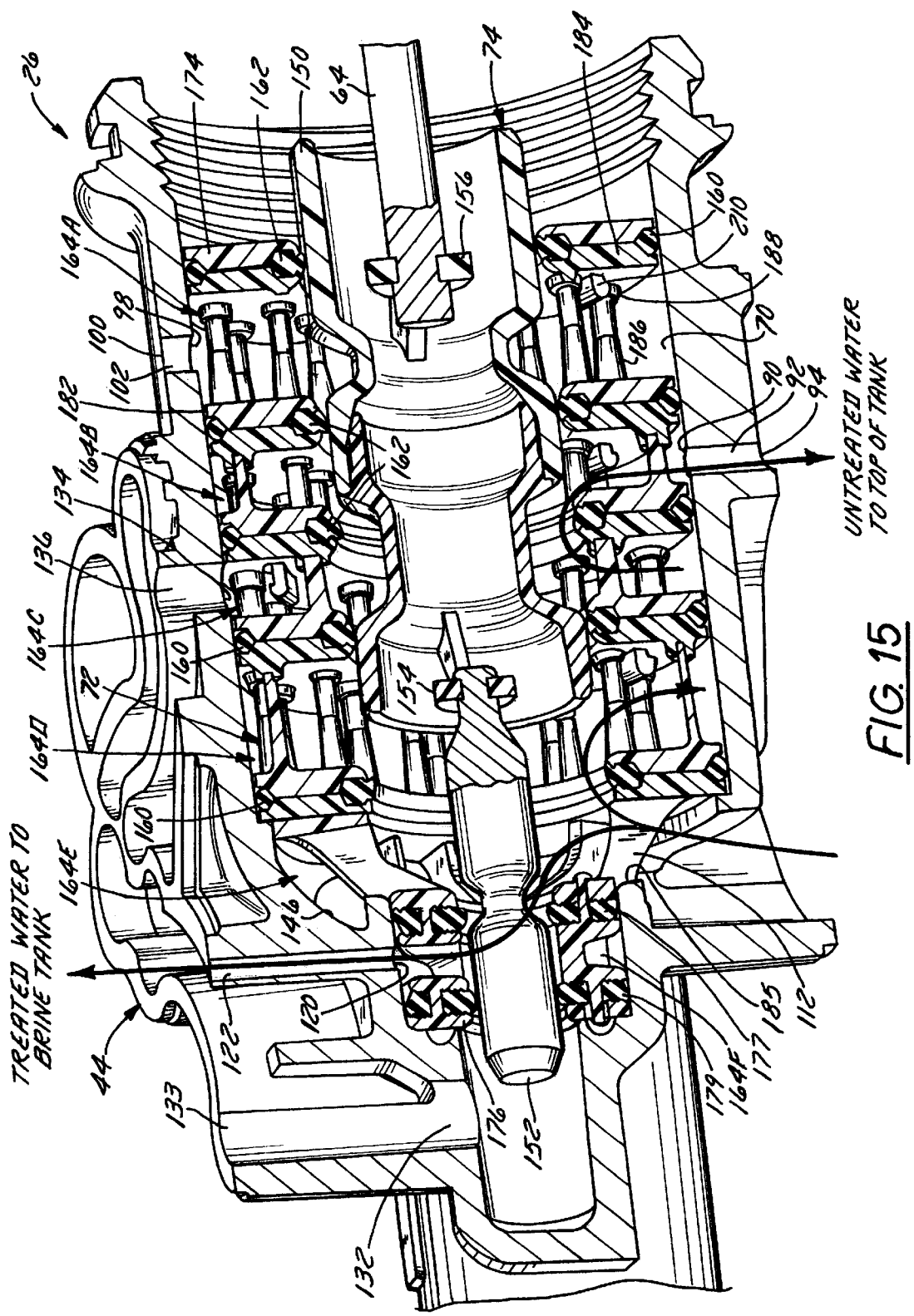

For instance, because it is known that a given number of detected pulses translates into a given stroke of the piston 74, the motor 302 can be controlled to drive the piston 74 to a desired position within the bore 70 simply by counting the number of pulses from start. Hence, assuming that the piston 74 moves 0.2 inches from the service position of FIG. 14 to the fill position of FIG. 15 and that the encoder 404 counts 100 pulses for every 0.1 inch of piston motion, then a fill phase of a regeneration cycle is initiated by supplying drive current to the driver 408 until the counter 418 counts 200 pulses, at which time the ports 112 and 120 are in full communication with each other as shown in FIG. 15. Because this motion occurs relatively rapidly, the valve assembly 26 never encounters any prolonged period of a partially-opened state and, accordingly, is less prone to clogging and other problems than systems in which piston movement between positions is more gradual. Unlike with offset cam-type drives, the piston 74 can be positioned at an intended location in the bore 70 within a few thousandths of an inch.

The combination of the electronic control system 400 and the reversible, variable torque DC electric motor 302 permits operation of the control valve assembly 26 to be controlled in a highly versatile, highly precise manner and to be optimized for a particular application. It also permits the control valve assembly 26 to respond to problems such as a stuck piston or an obstruction in the piston's path.

For instance, the combination of the control system and the reversible DC motor permits the sequence of the regeneration cycle described in Section 4 above to be varied. That sequence can be described as service, fill, backwash, regeneration, and rinse. Prior art water softener control valve assemblies having cams or control linkages physically configured to effect that sequence would be locked to it. The valve assembly 26 is not because it is driven by the controllable reversible motor 302. For instance, the fill phase of the regeneration cycle could be performed either before or after the regeneration phase. Other phases of the regeneration cycle could also be performed out of order, skipped, or repeated as desired to meet the needs of a particular application.

Another advantage of employing a control system and a reversible, variable torque electric motor to control the valve assembly 26 is the ability to overcome or at least react to problems within the valve assembly 26 such as a stuck piston 74 or an obstruction in the piston's path. A prior art piston encountering either problem would likely be lodged in the position in which that problem occurs until the water softener is serviced. If that problem were to occur during any operational phase other than the service phase of the valve's operational cycle, the water softener would be completely ineffective until it is repaired. If it were to occur in a phase in which water is being discharged to drain, the system would waste a substantial quantity of water. A water softener control valve assembly constructed in accordance with the invention is not as prone to this problem because it can be controlled via a routine designed to avoid it.

Figure 21:
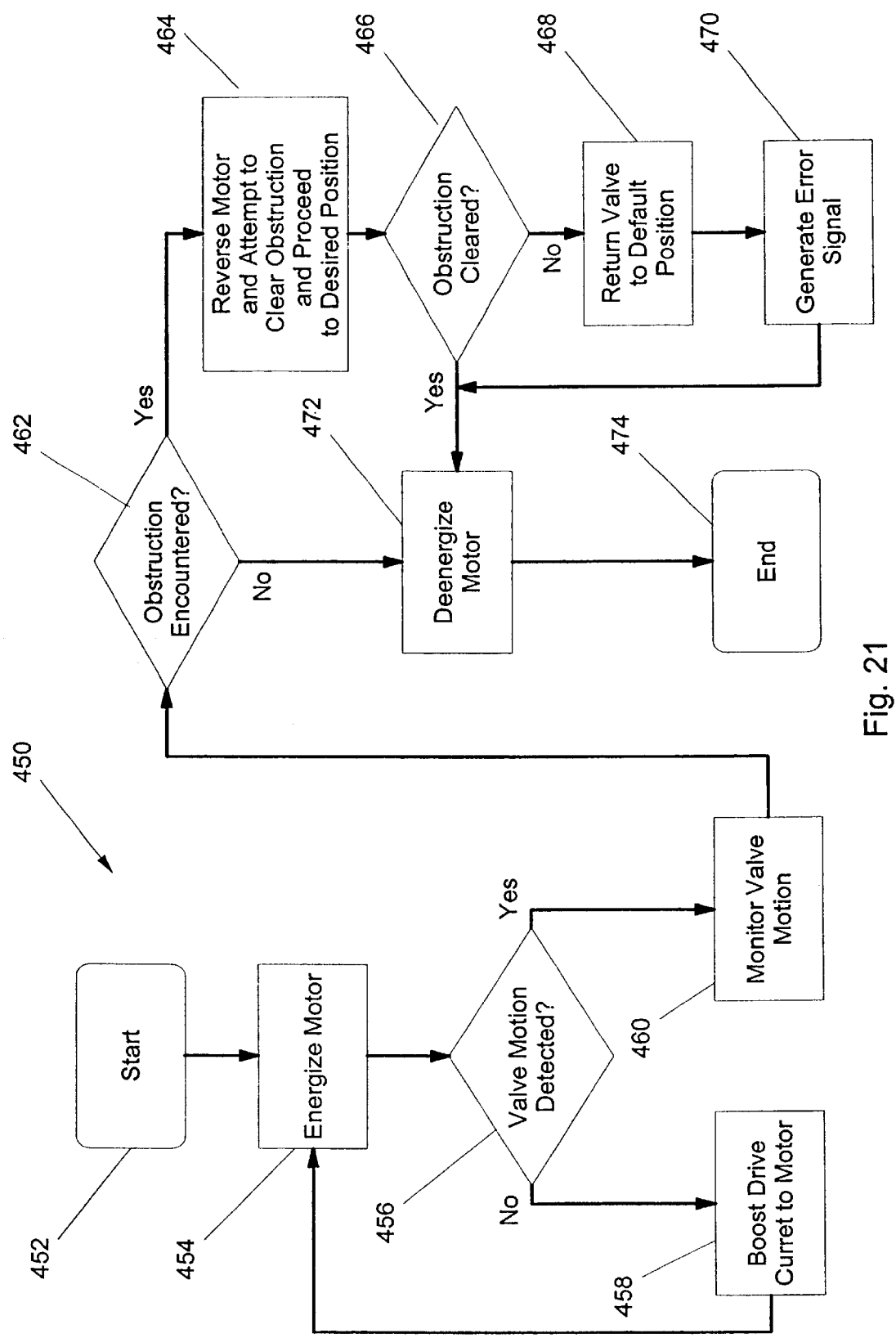
FIG. 21 is a flowchart illustrating a manner of operation of the controller of FIG. 20.

For instance, referring to FIG. 21, upon initiation of any given phase of a regeneration cycle, one such routine 450 proceeds from START at 452 to block 454, in which the controller 402 supplies energizing current to the motor driver 408 to energize the motor 302. Then, after a brief period of time as monitored by the timer 416, the routine 450 determines at 456 whether any pulses have been counted and, accordingly, whether any piston motion has occurred. If the answer to this inquiry is no, hence indicating that the piston 74 is stuck, the routine 450 could then boost drive current to the driver 408 at 458 in an attempt to free the piston 74 from its stuck position. This procedure may be repeated as necessary until piston motion is detected or until maximum drive current is applied to the motor 302 without piston motion being detected (in the latter event, not shown in FIG. 21, the routine would error out and proceed to END).

Once piston motion is detected, the controller 402 monitors piston motion and counts pulses at 460 until the number of pulses required for the piston 74 to move into the commanded position has been tallied. If the piston 74 encounters an obstruction during this motion, the pulse count will not reach the commanded number, and the routine 450 will determine at 462 that the piston 74 has encountered an obstruction. It will then attempt to clear the obstruction in block 464 by 1) reversing the drive current to motor 302 for a sufficient period of time to back the piston 74 away from its obstructed position and 2) then resuming the supply of normal forward drive current to the motor 302. The routine 450 then determines at 466 whether this attempt (or a designated number of such attempts such as two or three) is successful. This determination can be made simply by tallying the aggregate number of forward pulses counted since receipt of the initial valve actuation command and subtracting the aggregate counted number of rearward pulses from that number. If the attempt to clear the obstruction is ultimately unsuccessful, the motor is driven to attempt to return the piston 74 to its service position at 468, boosting the drive current to the motor 302, if necessary. If the attempt to return the piston 74 to its service position is unsuccessful, the piston 74 will at least be returned to another default position in which no more water than necessary is directed to drain. The routine 450 then generates an error signal at 470 which is displayed via control of the display driver(s) 410. The motor 302 is then de-energized at 472, and the routine 450 proceeds to END at 474.

If, on the other hand, the commanded number of pulses is counted without encountering an obstruction, the routine 450 determines that the piston 74 has reached the desired position and de-energizes the motor 302 at 472 before proceeding to END at 474. The piston 74 will remain in that position until the next phase of a regeneration cycle is initiated under operation of the timer 416 and possibly other control elements, at which time the routine 450 will be repeated for that phase of the regeneration cycle.

Upon termination of the regeneration cycle, the motor 302 will drive the piston 74 against an end stop (not shown) located adjacent the service position. Engagement of the piston 74 with the end stop will be detected by the current limiter output of the motor driver 408. The controller will then energize the motor 302 to back the piston 74 away from the end stop a small amount to place the piston 74 in its service position, boosting the drive current to the motor, if necessary. Because the service position is spaced from the end stop, overstressing of the piston 74 and lead screw assembly 314 that might otherwise occur if the motor 302 were to leave the piston 74 in a position in which it is forced against the end stop is avoided, and gear train life is lengthened.

Many changes and modifications may be made within the scope of the present invention without departing from the spirit thereof. The scope of these changes will become more readily apparent from a reading of the appended claims.

We claim:

1. A water conditioning unit control device comprising:
   (A) a control valve including a linearly reciprocatable piston;
   (B) a reversible electric motor having a rotary output element;
   (C) a converter which has an input coupled to said output element of said motor and which has an output which is coupled to said piston such that said piston moves linearly with said converter output, wherein said converter converts bidirectional rotary motion of said motor output element to reciprocating linear movement of said piston, and wherein said converter includes a lead screw arrangement including (1) a driven gear which is driven by said output element of said motor and which has internal threads, and (2) an externally threaded shaft which extends through said driven gear in mating engagement with the threads thereof so as to move linearly relative to said driven gear upon rotation of said driven gear and which is attached to or integral with the piston;
   (D) a cap which is mountable on a valve housing for the control valve, said cap having a bore formed therethrough;
   (E) a guide bushing which is fixed in said bore and which slidably receives said shaft; and
   (F) a bearing which is disposed between said bushing and said driven gear.

2. The water conditioning unit control device as recited in claim 1, wherein said motor output element comprises a pinion.

3. The water conditioning unit control device as recited in claim 1, further comprising a gear train disposed between said pinion and said driven gear.

4. The water conditioning unit control device as recited in claim 1, wherein said control valve comprises a valve housing, a linearly reciprocatable valve spool forming at least a portion of said piston, and a stationary seal stack having a plurality of axially-spaced dynamic seals, said valve housing having an internal bore which houses said seal stack and which has a plurality of axially-spaced ports including at least an untreated water inlet port and a treated water outlet port, said valve spool having a plurality of axially-spaced lands thereon which selectively engage said dynamic seals to place selected ones of said ports into communication with one another.

5. The water conditioning unit control device as recited in claim 1, wherein said control valve comprises a water softener control valve, and wherein said piston is movable between at least a service position and a regeneration position.

6. The water conditioning unit control device as recited in claim 1, wherein said control valve comprises a filtration device control valve controlling operation of a filtration system.

7. A drive arrangement for a linearly reciprocatable water conditioning device control valve, the drive arrangement comprising:
   (A) an electric motor having a rotary output element;
   (B) a linear drive arrangement which has an input which is operatively coupled to said output of said motor and which has an output which is configured for connection to a piston of the control valve, wherein said output of said linear drive arrangement is configured to translate along an axis which is collinear with a longitudinal axis of the piston and to drive the piston without imposing any significant side load on a support structure for a drive structure of the piston or to seals sealing the drive structure against the support structure, and wherein said linear drive arrangement includes a lead screw assembly including (1) a driven gear which is driven by said output element of said motor and which has internal threads, and (2) an externally threaded shaft which extends through said driven gear in mating engagement with the threads thereof so as to move linearly relative to said driven gear upon rotation of said driven gear and which has a distal end portion which is attached to or integral with said piston;

(C) a cap which is mountable on a valve housing for the control valve, said cap having a bore formed therethrough;

(D) a bushing which is fixed in said bore and which slidably receives said shaft; and (E) a bearing which is disposed between said bushing and said driven gear.

8. The drive arrangement as recited in claim 7, further comprising a gear train disposed between said rotary output element and said linear drive arrangement.

9. The drive arrangement as recited in claim 7, wherein the motor is a reversible motor.

10. A water conditioning unit control device comprising:

(A) a control valve including a piston which is movable linearly between a plurality of positions with respect to a valve bore of said control valve, thereby selectively connecting various ports in said valve bore to one another, said ports including at least an untreated water inlet port and a treated water outlet port;

(B) a reversible electric motor which has an output element which is coupled to said piston and which is actuatable to drive said piston between said positions; and (C) a controller which is coupled to said motor and which includes
1) a position monitor which monitors movement of said piston, and
2) a driver which is coupled to said position monitor and to said motor and which controls operation of said motor based on signals from said position monitor.

11. The water conditioning unit control device as recited in claim 10, wherein said position monitor comprises an encoder that measures rotation of a gear coupled to said piston.

12. The water conditioning unit control device as recited in claim 10, wherein said motor is a variable torque motor the output torque of which can be varied by varying the magnitude of drive current supplied thereto.

13. The water conditioning unit control device as recited in claim 10, further comprising a lead screw arrangement comprising 1) a driven gear which is driven by said output element of said motor and which has internal threads, and 2) an externally threaded shaft which a) extends through said driven gear in mating engagement with the threads thereof so as to move linearly relative to said driven gear upon rotation of said driven gear and b) has a distal end portion which is attached to or formed integrally with said piston.

14. The water conditioning unit control device as recited in claim 10, wherein said controller is operable, based on signals received from said position monitor, to determine whether said piston is stuck and to boost drive current to said motor if it is determined that said piston is stuck.

15. The water conditioning unit control device as recited in claim 10, wherein said controller is operable, based on signals received from said position monitor, to determine whether said piston has encountered an obstruction, and wherein, if it is determined that said piston has encountered an obstruction when traveling towards an intended position, said controller is operable to attempt to clear said obstruction by supplying energizing current to said motor to back said piston away from said obstruction and by thereafter supplying energizing current to said motor to drive said piston back toward the intended position.

16. The water conditioning unit control device as recited in claim 15, wherein, if the obstruction cannot be cleared, said controller is operable to supply energizing current to said motor to attempt to return said piston to a default position thereof.

17. The water conditioning unit control device as recited in claim 10, wherein said piston is movable through a plurality of linearly-aligned positions, each of which corresponds to a respective operational phase of an operational cycle of said water conditioning unit, and wherein said controller is operable to drive said piston in a single operational cycle of the water conditioning unit to at least one of 1) skip at least one of said positions and 2) stop movement of said piston at at least one of said positions twice.

18. The water conditioning unit control device as recited in claim 10, wherein the water conditioning device is one of a water softener and a filter.

19. The water conditioning unit control device as recited in claim 18, wherein the water conditioning device is a water softener.

20. A method of controlling operation of a water conditioning unit control device, comprising:

(A) supplying energizing current to a reversible electric motor to drive a piston of a control valve to move linearly with respect to a valve bore of the control valve, thereby selectively connecting various ports in said valve bore to one another, said ports including at least an untreated water inlet port and a treated water outlet port;

(B) monitoring movement of said piston using a position monitor; and (C) controlling the supply of energizing current to said motor based on signals from said position monitor.

21. The method as recited in claim 20, wherein the monitoring step comprises monitoring rotation of a rotary drive member that is coupled to said piston.

22. The method as recited in claim 20, further comprising varying the magnitude of drive current to said motor to vary an output torque of said motor.

23. The method as recited in claim 22, further comprising sensing an operational state in which said piston is stuck, and wherein the varying step comprises boosting drive current to said motor upon determining that said piston is stuck.

24. The method as recited in claim 20, further comprising determining whether said piston has encountered an obstruction and, if it is determined that said piston has encountered an obstruction when traveling toward an intended position, attempting to clear said obstruction by supplying energizing current to said motor to back said piston away from said obstruction and by thereafter supplying energizing current to said motor to drive said piston back toward the intended position.

25. The method as recited in claim 24, further comprising, if the obstruction cannot be cleared, supplying energizing current to said motor to attempt to return said piston to a default position thereof.

26. The method as recited in claim 25, wherein said default position is a service position.

27. The method as recited in claim 20, wherein, as a result of said supplying step, said piston moves through a plurality of linearly-aligned positions, each of which corresponds to a respective operational phase of an operational cycle of said water conditioning device, and further comprising supplying energizing current to said motor to drive said piston in a single operational cycle of said water conditioning device to at least one of 1) skip at least one of said positions and 2) stop movement of said piston of at least one of said positions twice.

28. The method as recited in claim 20, wherein the water conditioning device is a water softener, and wherein the positions include at least a service position and a regeneration position.

\* \* \* \* \*

UNITED STATES PATENT AND TRADEMARK OFFICE
CERTIFICATE OF CORRECTION

| | |
|---|---|
| PATENT NO. | : 6,444,127 B1 |
| DATED | : September 3, 2002 |
| INVENTOR(S) | : Don Vaughan, Richard W. Wilder and Robert A. Clack |

It is certified that error appears in the above-identified patent and that said Letters Patent is hereby corrected as shown below:

<u>Title page,</u>
Item [73], Assignee, please delete "Clack Corportion" and replace with -- Clack Corporation --.

Signed and Sealed this

Eleventh Day of March, 2003

JAMES E. ROGAN
*Director of the United States Patent and Trademark Office*